US010091238B2

(12) United States Patent
Shieh et al.

(10) Patent No.: US 10,091,238 B2
(45) Date of Patent: Oct. 2, 2018

(54) DECEPTION USING DISTRIBUTED THREAT DETECTION

(71) Applicant: vArmour Networks, Inc., Mountain View, CA (US)

(72) Inventors: Choung-Yaw Shieh, Palo Alto, CA (US); Marc Woolward, Santa Cruz, CA (US); Zhiping Liu, Saratoga, CA (US); Cheng-Lin Hou, San Jose, CA (US); Matthew M. Williamson, Marblehead, MA (US); Yi Hung Cheng, Taipei (TW); Chien Yang Hsu, New Taipei (TW); Hsin Tien Tseng, Taipei (TW)

(73) Assignee: vArmour Networks, Inc., Mountain View, CA (US)

(*) Notice: Subject to any disclaimer, the term of this patent is extended or adjusted under 35 U.S.C. 154(b) by 0 days.

(21) Appl. No.: 15/448,581

(22) Filed: Mar. 2, 2017

(65) Prior Publication Data
US 2017/0180421 A1 Jun. 22, 2017

Related U.S. Application Data

(63) Continuation-in-part of application No. 14/480,318, filed on Sep. 8, 2014, now Pat. No. 9,621,568, and a
(Continued)

(51) Int. Cl.
*H04L 29/06* (2006.01)
*G06F 12/14* (2006.01)
*H04L 9/32* (2006.01)

(52) U.S. Cl.
CPC ........ *H04L 63/1491* (2013.01); *H04L 63/029* (2013.01); *H04L 63/0263* (2013.01); *H04L 63/10* (2013.01); *H04L 63/1416* (2013.01)

(58) Field of Classification Search
CPC ... H04L 63/1491; H04L 63/10; H04L 63/029; H04L 63/0263; H04L 63/1416
(Continued)

(56) References Cited

U.S. PATENT DOCUMENTS 6,253,321 B1 6/2001 Nikander et al.
6,484,261 B1 11/2002 Wiegel
(Continued)

FOREIGN PATENT DOCUMENTS

TW 201642616 A 12/2016
TW 201642617 A 12/2016
(Continued)

OTHER PUBLICATIONS

"International Search Report" and "Written Opinion of the International Searching Authority," Patent Cooperation reaty Application No. PCT/US2016/024116, dated May 3, 2016, 12 pages.
(Continued)

*Primary Examiner* — Aravind K Moorthy
(74) *Attorney, Agent, or Firm* — Carr & Ferrell LLP

(57) ABSTRACT

Methods and systems for deception using distributed threat detection are provided. Exemplary methods by an enforcement point, the enforcement point communicatively coupled to a first data network and a second data network, the enforcement point not providing services in the second data network, include: receiving, from a first workload in the second data network, a data packet addressed to a second workload in the second data network, the data packet requesting a service from the second workload; determining the data packet is for unauthorized access of the second workload, the determining using at least some of a 5-tuple of the data packet; identifying a deception point using the service, the deception point being in the first data network
(Continued)

and including a decoy for the service; and redirecting the data packet to the deception point in the first data network.

20 Claims, 16 Drawing Sheets

Related U.S. Application Data continuation-in-part of application No. 14/677,827, filed on Apr. 2, 2015, and a continuation-in-part of application No. 15/413,417, filed on Jan. 24, 2017, which is a continuation-in-part of application No. 14/480,318, filed on Sep. 8, 2014, now Pat. No. 9,621,568, and a continuation-in-part of application No. 15/299,433, filed on Oct. 20, 2016, which is a continuation-in-part of application No. 15/201,351, filed on Jul. 1, 2016, which is a continuation-in-part of application No. 15/192,967, filed on Jun. 24, 2016, now Pat. No. 9,560,081, said application No. 15/413,417 is a continuation-in-part of application No. 15/394,640, filed on Dec. 29, 2016.

(60) Provisional application No. 61/965,981, filed on Feb. 11, 2014.

(58) Field of Classification Search
USPC .............................. 726/1, 22; 713/165, 168
See application file for complete search history.

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,516,476 B1 | 4/2009 | Kraemer et al. |
| 7,519,062 B1 | 4/2009 | Kloth et al. |
| 7,694,181 B2 | 4/2010 | Noller et al. |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,798,055 B1 | 8/2014 | An |
| 8,813,169 B2 | 8/2014 | Shieh et al. |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,027,077 B1 | 5/2015 | Bharali et al. |
| 9,060,025 B2 | 6/2015 | Xu |
| 9,141,625 B1 | 9/2015 | Thornewell et al. |
| 9,191,327 B2 | 11/2015 | Shieh |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,973,472 B2 | 5/2018 | Woolward et al. |
| 10,009,317 B2 | 6/2018 | Woolward |
| 10,009,381 B2 | 6/2018 | Lian et al. |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1* | 1/2007 | Bassett ............... H04L 63/0263 726/11 |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | van Rietschote et al. |
| 2007/0168971 A1 | 7/2007 | Royzen et al. |
| 2007/0192861 A1* | 8/2007 | Varghese ............. H04L 63/145 726/23 |
| 2007/0192863 A1 | 8/2007 | Kapoor et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1* | 3/2009 | Lang ................... H04L 63/0263 726/1 |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Bimbach |

(56) References Cited

U.S. PATENT DOCUMENTS

| | | |
|---|---|---|
| 2010/0095367 A1 | 4/2010 | Narayanaswamy |
| 2010/0191863 A1* | 7/2010 | Wing .............. H04L 29/12066 709/245 |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1* | 8/2010 | Lee .................. H04W 36/0055 370/331 |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0333165 A1 | 12/2010 | Basak et al. |
| 2011/0003580 A1 | 1/2011 | Belrose et al. |
| 2011/0069710 A1 | 3/2011 | Naven et al. |
| 2011/0072486 A1 | 3/2011 | Hadar et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1* | 5/2012 | Brown .................. G06N 5/048 706/52 |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0081142 A1 | 3/2013 | McDougal et al. |
| 2013/0086399 A1 | 4/2013 | Tychon et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1* | 10/2014 | Stuntebeck ........... H04L 63/102 726/1 |
| 2014/0344435 A1 | 11/2014 | Mortimore, Jr. et al. |
| 2015/0047046 A1* | 2/2015 | Pavlyushchik ....... G06F 21/577 726/25 |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0229641 A1 | 8/2015 | Sun et al. |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0191545 A1 | 6/2016 | Nanda et al. |
| 2016/0203331 A1 | 7/2016 | Khan et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2017/0063795 A1 | 3/2017 | Lian et al. |
| 2017/0134422 A1 | 5/2017 | Shieh et al. |
| 2017/0168864 A1 | 6/2017 | Ross et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0279770 A1 | 9/2017 | Woolward et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0191779 A1 | 7/2018 | Shieh et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

"International Search Report" and "Written Opinion of the International Searching Authority," Patent Cooperation Treaty Application No. PCT/US2016/024300, dated May 3, 2016, 9 pages.

"International Search Report" and "Written Opinion of the International Searching Authority," Patent Cooperation Treaty Application No. PCT/US2016/024053, dated May 3, 2016, 12 pages.

"International Search Report" and "Written Opinion of the International Searching Authority," Patent Cooperation Treaty Application No. PCT/US2016/019643, dated May 6, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, dated Jun. 20, 2016, 9 pages.

"Feature Handbook: NetBrain® Enterprise Edition 6.1" NetBrain Technologies, Inc., Feb. 25, 2016, 48 pages.

Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.

"International Search Report" and "Written Opinion of the International Searching Authority," Patent Cooperation Treaty Application No. PCT/US2016/065451, dated Jan. 12, 2017, 20 pages.

Maniar, Neeta, "Centralized Tracking and Risk Analysis of 3rd Party Firewall Connections," SANS Institute InfoSec Reading Room, Mar. 11, 2005, 20 pages.

Hu, Hongxin et al., "Detecting and Resolving Firewall Policy Anomalies," IEEE Transactions on Dependable and Secure Computing, vol. 9, No. 3, May/Jun. 2012, pp. 318-331.

Non-Final Office Action, dated Jun. 19, 2017, U.S. Appl. No. 15/479,728, filed Apr. 5, 2017.

Non-Final Office Action, dated Jul. 7, 2017, U.S. Appl. No. 14/964,318, filed Dec. 9, 2015.

(56) References Cited

OTHER PUBLICATIONS

Non-Final Office Action, dated Jul. 19, 2017, U.S. Appl. No. 15/334,151, filed Oct. 25, 2016.

\* cited by examiner

DECEPTION USING DISTRIBUTED THREAT DETECTION

CROSS-REFERENCE TO RELATED APPLICATIONS

This application is a continuation-in-part of U.S. patent application Ser. No. 14/480,318, filed Sep. 8, 2014, now U.S. Pat. No. 9,621,568 which claims priority to U.S. Provisional Application No. 61/965,981, filed Feb. 11, 2014, the disclosures of which are hereby incorporated by reference for all purposes. This application is also a continuation-in-part of U.S. patent application Ser. No. 14/677,827, filed Apr. 2, 2015, now U.S. Pat. No. 9,973,472. This application is also a continuation-in-part of U.S. patent application Ser. No. 15/413,417, filed Jan. 24, 2017. U.S. patent application Ser. No. 15/413,417 is a continuation-in-part of U.S. patent application Ser. No. 14/480,318, filed Sep. 8, 2014, now U.S. Pat. No. 9,621,568, which claims priority to U.S. Provisional Application No. 61/965,981, filed Feb. 11, 2014, the disclosures of which are hereby incorporated by reference for all purposes. U.S. patent application Ser. No. 15/413,417 is also a continuation-in-part of U.S. patent application Ser. No. 15/299,433, filed Oct. 20, 2016, the disclosure of which is hereby incorporated by reference for all purposes. U.S. patent application Ser. No. 15/299,433 is a continuation-in-part of U.S. patent application Ser. No. 15/201,351, filed Jul. 1, 2016, which is a continuation-in-part of U.S. patent application Ser. No. 15/192,967, filed Jun. 24, 2016, now U.S. Pat. No. 9,560,081, the disclosures of which are hereby incorporated by reference for all purposes. U.S. patent application Ser. No. 15/413,417 is further a continuation-in-part of U.S. patent application Ser. No. 15/394,640, filed Dec. 29, 2016, the disclosure of which is hereby incorporated by reference for all purposes.

TECHNICAL FIELD

The present technology pertains to the field of electronic communication, and more specifically to computer network security.

BACKGROUND ART

Computing networks are becoming ubiquitous in enterprises, providing secure and cost-effective access to resources. Those networks usually have a plurality of network devices, such as routers, network switches, wireless access points (AP), firewalls, servers, etc. deployed through the network. The network devices enable the exchange of data and/or services between network devices, as well as with other networks and devices outside of the network. In order to meet the demands of enterprises, an enterprise may deploy multiple physical computing networks at a single location, may logically divide a single network into different network segments, may deploy multiple physical or logical networks at different physical locations, as well as other network deployment configurations.

Not all network content, however, is innocuous or legitimate network content. Due to the extensive use of computer networks by enterprises, there has been a dramatic rise in network attacks, a proliferation of computer viruses, and a constant distribution of other types of malicious content that attempts to attack, infect, or otherwise infiltrate the computer networks. One approach for combating network threats is the deployment of a threat monitoring server within a segment of a computing network. The threat monitoring server is a physical or virtual server deployed in the network segment that emulates a production server within the network. That is, the threat monitoring server emulates a real world server and server applications of a production server within the network segment. By emulation of a production server in a network segment, potentially harmful network content can be routed to, tested, and analyzed within the network segment by the threat monitoring server to detect potential attacks. However, the threat monitoring server only operates in that particular network segment to detect threats to that network segment.

The threat monitoring servers are designed to receive and contain attacks or threats without affecting other production servers on the network. However, deploying threat-monitoring servers in all network segments, in different logical sections of a network, in different physical networks, etc. is costly. It requires many threat monitoring servers running various applications to be deployed on all network segments. Furthermore, additional deployment efforts and cost are required when new network segments are added. This problem is exacerbated in virtualized data centers, where new logical network segments are constantly added and removed.

A hardware firewall is a network security system that controls incoming and outgoing network traffic. A hardware firewall generally creates a barrier between an internal network (assumed to be trusted and secure) and another network (e.g., the Internet) that is assumed not to be trusted and secure.

Attackers breach internal networks to steal critical data. For example, attackers target low-profile assets to enter the internal network. Inside the internal network and behind the hardware firewall, attackers move laterally across the internal network, exploiting East-West traffic flows, to critical enterprise assets. Once there, attackers siphon off valuable company and customer data.

SUMMARY OF THE INVENTION

Some embodiments of the present technology include computer-implemented methods for deception using distributed threat detection, which may include: receiving, from a first workload in the second data network, a data packet addressed to a second workload in the second data network, the data packet requesting a service from the second workload; determining the data packet is for unauthorized access of the second workload, the determining using at least some of a 5-tuple of the data packet; identifying a deception point using the service, the deception point being in the first data network and including a decoy for the service; and redirecting the data packet to the deception point in the first data network.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details

DETAILED DESCRIPTION

Figure 1:
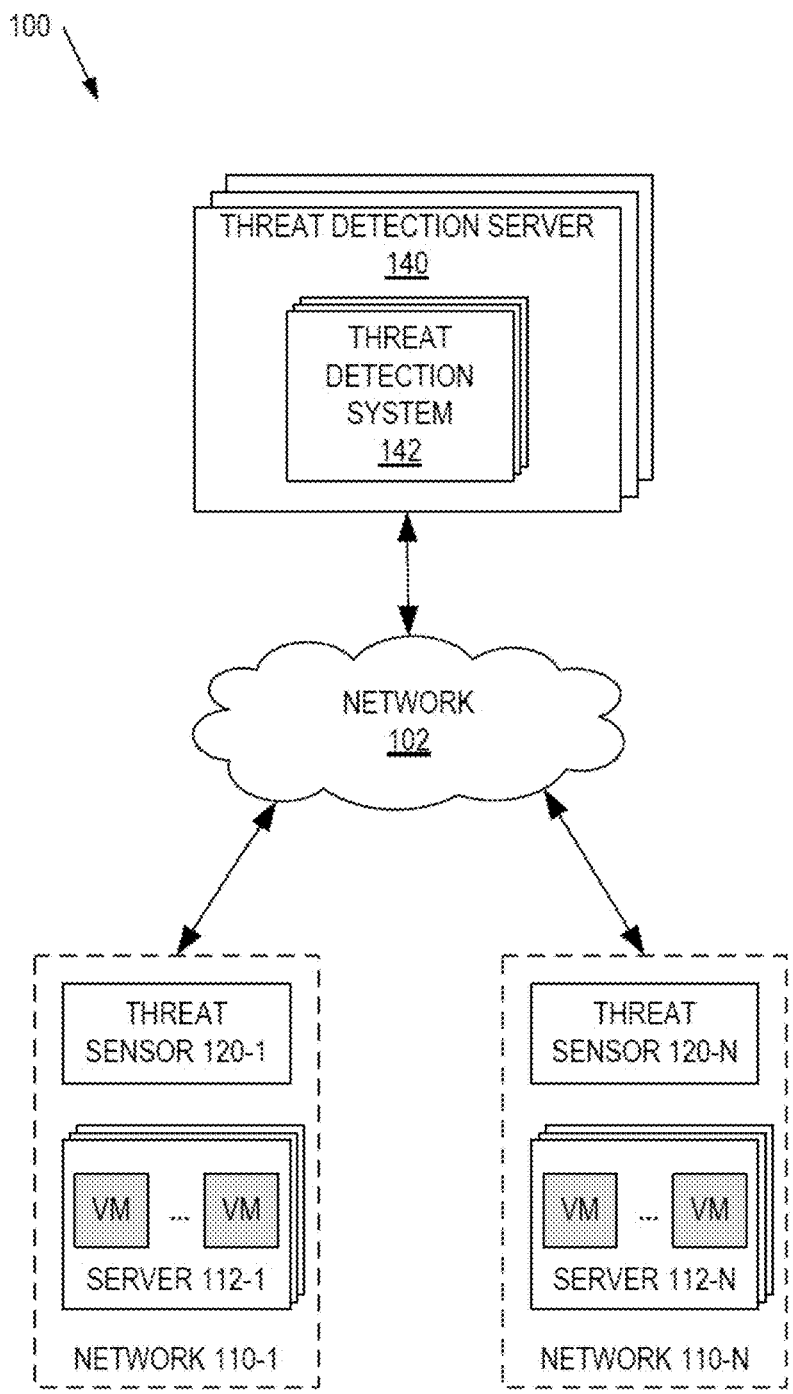
FIG. 1 is a block diagram of exemplary system architecture for distributed threat monitoring in one or more computer networks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Information technology (IT) organizations face cyber threats and advanced attacks. Firewalls are an important part of network security. Firewalls control incoming and outgoing network traffic using a rule set. A rule, for example, allows a connection to a specific (Internet Protocol (IP)) address (and/or port), allows a connection to a specific (IP) address (and/or port) if the connection is secured (e.g., using Internet Protocol security (IPsec)), blocks a connection to a specific (IP) address (and/or port), redirects a connection from one IP address (and/or port) to another IP address (and/or port), logs communications to and/or from a specific IP address (and/or port), and the like. A firewall rule at a low level of abstraction may indicate a specific (IP) address and protocol to which connections are allowed and/or not allowed.

Managing a set of firewall rules is a difficult challenge. Some IT security organizations have a large staff (e.g., dozens of staff members) dedicated to maintaining firewall policy (e.g., a firewall rule set). A firewall rule set can have tens of thousands or even hundreds of thousands of rules. Some embodiments of the present technology may autonomically generate a reliable declarative security policy at a high level of abstraction. Abstraction is a technique for managing complexity by establishing a level of complexity which suppresses the more complex details below the current level. The high-level declarative policy may be compiled to produce a firewall rule set at a low level of abstraction.

Embodiments for distributed network threat detection are discussed herein. In embodiments, light-weight threat sensors are distributed and deployed in multiple different geographical, physical, and/or logical network segments to receive and forward network traffic to and from a centralized threat detection system. In one embodiment, a threat sensor is deployed and presented in a logical or virtual network segment as a local neighbor on the network segment. The threat sensor may be a virtual server deployed in the network segment or may be a process running in an existing network device, such as a firewall device, router, production server, etc. Furthermore, the threat sensor is assigned one or more network internet protocol (IP) addresses for the network segment. In one embodiment, the threat sensor provides passive services and only responds to service requests that it receives from other network elements. However, because the threat sensor is a passive service provider, and does not provide any production server functions (e.g., data routing, data management, virtual applications, or other services), any service request received by the threat sensors is viewed as a potential attack or probe from an infected network element (e.g., an infected host machine, an infected host process, an infected virtual process or virtual machine, etc.).

In one embodiment, threat sensors are distributed across different physical, logical, and virtual networks, and forward received network requests or probes to a centralized threat detection system. As discussed herein, the unsolicited requests received by threat sensors are treated as potentially malicious and originating from a potentially infected network element. The centralized threat detection system receives and then processes the requests and/or probes. That is, the centralized threat detection system emulates the requested service and interacts with the requestor over a series of message exchanges, analyzes the exchange of messages, and determines whether the network element is infected by a virus, malware, etc.

In one embodiment, the threat detection system may be a server or a cluster of servers in an isolated portion of a network that may be remote from one or more of the threat sensors. The threat sensors therefore coordinate communications between the potentially infected network elements, such as host machines or host processes, and the threat detection system. The coordinated communication is continued until the threat detection system has determined whether or not a network element that initiated an unsolicited request is an actual threat. The centralized threat detection system may interact with any number of physically distributed, logically distributed, and/or virtually distributed threat sensors in parallel to expose the presence of threats in various dynamic and distributed network configurations. However, the typical cost and effort of distributing individual threat monitoring servers to different and new network segments is eliminated.

As discussed in greater detail below, each threat sensor exposes the services of the threat monitoring system to the network segment in which the threat sensor is deployed. In one embodiment, the threat sensor is a virtualized passive server that may be dynamically created or removed, as different logical or virtual network segments are created or removed. Thus, any number of threat sensors may be deployed around data centers, around networks, etc., and communicate potential threats to the threat detection system deployed and managed in a centralized location.

FIG. 1 is a block diagram of exemplary system architecture 100 for distributed threat monitoring in one or more computer networks. System architecture illustrates a plurality of networks including network 102 and network 110-1 through network 110-N. The networks 110-1 through 110-N, as referred to and discussed herein, may run on one or more Local Area Networks (LANs) and may be incorporated into the same geographical, physical, or logical systems, or different geographical, physical, or logical systems. Alternatively, networks 110-1 through 110-N may reside on different LANs, wide area networks, etc. that may be coupled together via a network 102, such as the internet, but separated by firewalls, routers, and/or other network devices operating within their respective physical or logical network segments. It should be noted that various other network configurations can be used including, for example, hosted configurations, distributed configurations, centralized configurations, etc.

The system architecture 100 includes a threat detection server 140, and one or more threat sensors, such as threat sensors 120-1 through 120-N, distributed in networks 110-1 through 110-N. As discussed herein, networks 110-1 through 110-N may be different segments of the same physical network, different logical network segments within the same physical network, different networks provisioned to different organizations, networks distributed across different geographical locations, other network configuration types, as well as a combination of different network configurations. However, in each of the different configurations of network segments, each network segment includes at least one threat sensor.

In one embodiment, each threat sensor performs a process for identifying potential threats within a corresponding network segment. For example, threat sensor 120-1 enables threat detection within network segment 110-1 while threat sensor 120-N enables threat detection within network segment 110-N. In one embodiment, threat sensors may be incorporated into an existing network device, such as a router, firewall, etc., which perform the threat detection functions discussed herein. In another embodiment, a threat sensor, such as threat sensor 120-1, may be executed as an agent or virtual machine (VM) process within an existing network device, such as server 112-1. In yet another embodiment, a threat sensor may be executed as a process within a VM hypervisor (such as VMware ESXi, Citrix Xen, or KVM hypervisors) that supports the virtual machines of server 112-1. Each network segment may include a different deployment of its respective threat sensor, which can be selected based on the topology, performance characteristics, computing resources, etc. associated with that network segment.

In one embodiment, each of threat sensors 120-1 through 120-N is assigned one or more internet protocol (IP) addresses in its associated local network segment (e.g., network segments 110-1 through 110-N). By assigning one or more IP addresses within a network segment, such as network 110-1, threat sensor 120-1 appears to be a local neighboring device, virtual process, service, etc. within network 110-1. However, as discussed above, each of threat sensors 120-1 through 120-N is not a production server or service within their corresponding network segments, and the other network elements operating in the network segments should not seek to contact threat sensors 120-1 through 120-N. When a threat sensor is contacted with a probe, address inquiry, or other unsolicited request from a network element, the contacted threat sensor identifies the requesting network entity and/or traffic as a potential threat within the network segment. The threat sensor then forwards and coordinates communication between the network entity that originated the request and the threat detection system 140, as discussed herein.

Threat detection server 140 is communicatively coupled with each of threat sensors 120-1 through 120-N via network 102. In one embodiment, threat detection server 140 provides a centralized source for providing the detection of threats within distributed networks 110-1 through 110-N. Threat detection server 140 may include a single server computer system, or a cluster of server computer systems, for providing threat detection system(s) 142. Furthermore, each of the threat detection server(s) 140 can execute one or more threat detection systems 142, with additional threat detection systems 142 dynamically established based on real-time properties. For example, a number of virtualized threat detection systems 142, executed as processes within a virtual environment of the threat detection server(s) 140, may be dynamically provisioned by the threat detection server(s) 140 based on real-time threat conditions within networks 110-1 through 110-N, as well as real-time resource usage at threat detection server(s) 140.

In one embodiment, a threat detection system 142 receives traffic, identified by a threat sensor from an unsolicited request/contact from a network element as potentially malicious network traffic. Threat detection system 142 then emulates the requested service, response, etc. requested by the potentially malicious network traffic. In one embodiment, threat detection system 142 continues the exchange of data with the network element, emulates the requested services, and analyzes the actions of the network element until threat detection system 142 determines that the network element is infected, the traffic is malicious, or no threat is present. When a threat is detected, threat detection system 142 may then notify a network administrator of a corresponding network segment, identify the network element, and/or provide additional identification data to enable the network administrator to take remediative actions to address the identified threat to the network segment.

In one embodiment, when a threat sensor receives unsolicited network traffic from a network element, it may respond to the network element before forwarding the traffic to the threat monitoring server 140, as discussed above. In one embodiment, the unsolicited network traffic may be communicated to the threat sensor using Layer 2 network protocols (e.g., Ethernet protocol), Layer 3 protocols (e.g., IP protocol), Layer 7 protocols (e.g., HTTP). In one embodiment, where the unsolicited message is communicated as Layer 2 protocol traffic, such as Ethernet protocol messages, the receiving threat sensor imitates a local host on the same subnet and responds to, for example, an address response protocol (ARP) messages. In one embodiment, where the unsolicited message is communicated as Layer 3 protocol traffic, such as IP protocol messages, the receiving threat sensor may either perform network address translation, or use a tunnel protocol (such as IP-IP or GRE protocol), to forward the IP traffic to the threat detection server 140. In one embodiment, where the unsolicited message is communicated using encryption protocols, such as SSH, SSL or TLS, the receiving threat sensor performs as an SSH/SSL/TLS proxy to terminate the encrypted connections, and then forwards the traffic to the threat detection server 140 either in clear format, or re-encrypted in a way that will enable threat detection server 140 to decrypt the re-encrypted traffic.

In one embodiment, threat detection server 140 processes multiple connections to the distributed threat sensors (e.g., threat sensors 120-1 through 120-N) at the same time. Thus, a number of threat monitoring servers needed to process ongoing threat detection can be minimized. That is, even when there are attacks happening on multiple network segments at the same time, the local threat sensors can receive and forward the monitored traffic to the centralized threat detection server 140 for processing the threats in parallel. The threat detection server 140 monitors/processes the potentially harmful network traffic from the different network segments at the same time from the centralized location, which eliminates the need to set up duplicated threat monitoring servers in multiple locations.

Figure 2:
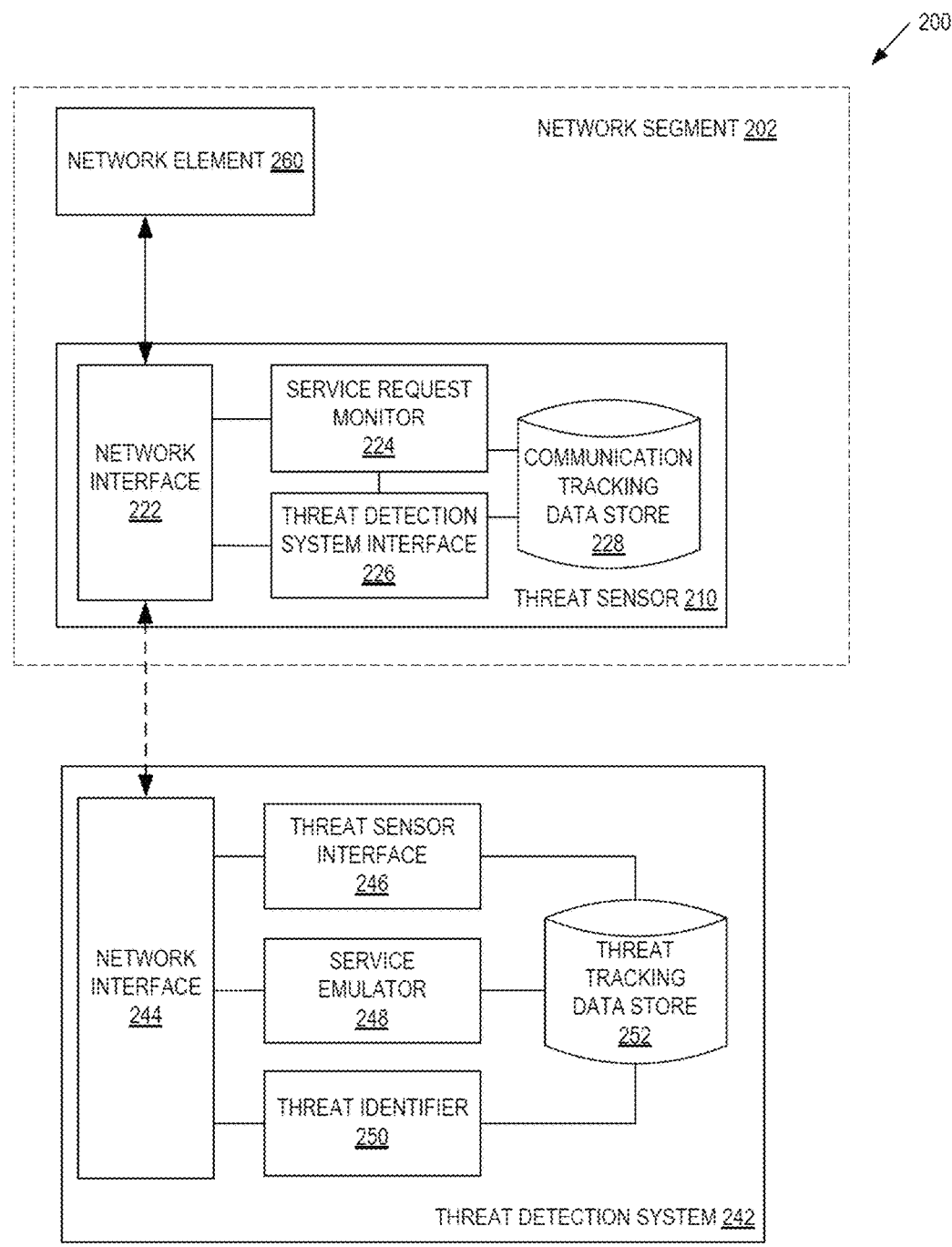
FIG. 2 is a block diagram of one embodiment of a network element, a threat sensor, and a threat detection system.

FIG. 2 is a block diagram of one embodiment 200 of a threat sensor 210, a threat detection system 242, and a network element 260. Threat sensor 210 and threat detection system 242, as illustrated in FIG. 2, provide additional details for threat sensors 120-1 through 120-N and threat detection system(s) 142 discussed above in FIG. 1.

In one embodiment, threat sensor 210 includes a network interface 222, service request monitor 224, threat detection system interface 226, and communication tracking data store 228. In one embodiment, threat sensor 210 may be a virtual machine process executed on a computer system in a segment of a network, a process run by a hypervisor on a computer system in a segment of a network, a process executed on a network device (e.g., a router, firewall, controller, etc.), etc. Furthermore, although only one threat sensor is illustrated, the techniques discussed herein may include a plurality of geographically or logically distributed threat sensors deployed on distributed segments of the same or different computer networks.

In one embodiment, threat detection system 242 includes a network interface 244, threat sensor interface 246, service emulator 248, threat identifier 250, and threat tracking data store 252. Threat detection system 242 may be a process executed on a server computer system. In one embodiment, a plurality of threat detection system processes may be executed in parallel on a single server computer system, or on a cluster of server computer systems, to enable the parallel processing of multiple distributed threats detected in different network segments. In one embodiment, the server computer system, or server cluster, processing potential threats may be centralized at a location remote from the threat sensor 210.

In one embodiment, network element 260 may be an existing device or process operating in network segment 202. Network element 260 may also be a new device or process within the network segment 202. In either case, network element 260 is capable of communicating with other devices and/or processes on the network segment 202, and issues one or more unsolicited requests on the same network segment in which threat sensor 210 is located.

In one embodiment, threat sensor 210 is deployed in network segment 202 and assigned on or more IP addresses within the network segment 202. Furthermore, as discussed herein, threat sensor 210 is passive within the network segment 202, as it does not provide any services typically associated with network production servers. Thus, when threat sensor 210 receives an unsolicited request or probe message from network element 260 via network interface 222, service request monitor 224 identifies the communication and source of the request as a potential threat.

In one embodiment, service request monitor 224 stores data identifying the request and/or requestor, such as originating IP address, source and destination port number, MAC address, type of request, etc. In one embodiment, service request monitor 224 may respond to network element 260 prior to forwarding the request to threat detection system 242, as discussed above. Threat detection system interface 226 routes the request to threat detection system 242 over a network (e.g., network 102 of FIG. 1) with any appropriate identification data of the requestor. In one embodiment, prior to forwarding the request, threat detection system interface 226 may exchange one or more messages with threat sensor interface 246 to initiate a new connection for the exchange and analysis of messages originating from the network element 260.

The original request of network element 260 is then forwarded from threat sensor 210 to threat detection system 242 via network interfaces 222 and 244. Threat sensor interface 246 receives the message and stores relevant identification data and/or configuration data in the threat tracking data store 252. For example, threat sensor interface may store a type of message, protocol associated with the message, identification data associated with the network element 260, identification data associated with the threat sensor 210, etc.

Service emulator 248 of threat detection system 242 then processes the request by emulating the service requested in the message. For example, when the message from network element 260 is to upload files to file storage, service emulator 248 emulates the file storage to store the file, which can be automatically analyzed to detect malware. As another example, service emulator 248 could emulate an SSH server that monitors the SSH activities. The response to the request is then sent from service emulator 248 to threat sensor 210.

Threat sensor 210 receives the threat detection system's 242 response to the request of the network element 260 at threat detection system interface 226. Any additional tracking information is added to communication tracking data store 228 for the present coordinated communication exchange. The response to the threat detection system 242 is then translated, as necessary, and forwarded to the network element 260.

In one embodiment, as discussed above, threat sensor 210 appears as a local neighbor to network element 260. Furthermore, since threat sensor 210 seamlessly coordinates, translates, and forwards the communication, requests and responses between the network element 260 and the threat detection system 242, the network element 260 believes that it is communicating with a local neighbor, and not the remote threat detection system 242. Furthermore, through the continued and coordinated exchange of request and response messages between the network element 260 and the threat detection system 242, threat identifier 250 of the threat detection system 242 is able to analyze an ongoing pattern of the exchange of data with the network element 260 to enable threat detection system 242 to identify sophisticated attack types and patterns.

In one embodiment, the exchange of messages is handled at the threat detection system 242 by service emulator 248. As discussed above, the service emulator may provide a plurality of service options, such as emulated address translation, emulated process server functions, emulated data center processes, emulated handling of data access functions, etc. for handling the potential requests of the network element 260. However, in the event that service emulator 248 is unable to process a requested service of the network element, threat identifier 250 informs threat sensor 210 of the failure. In one embodiment, the threat sensor 210 handles the failure to process the request as an identification of a threat, and one or more remediative actions are initiated, as discussed herein.

Figure 3:
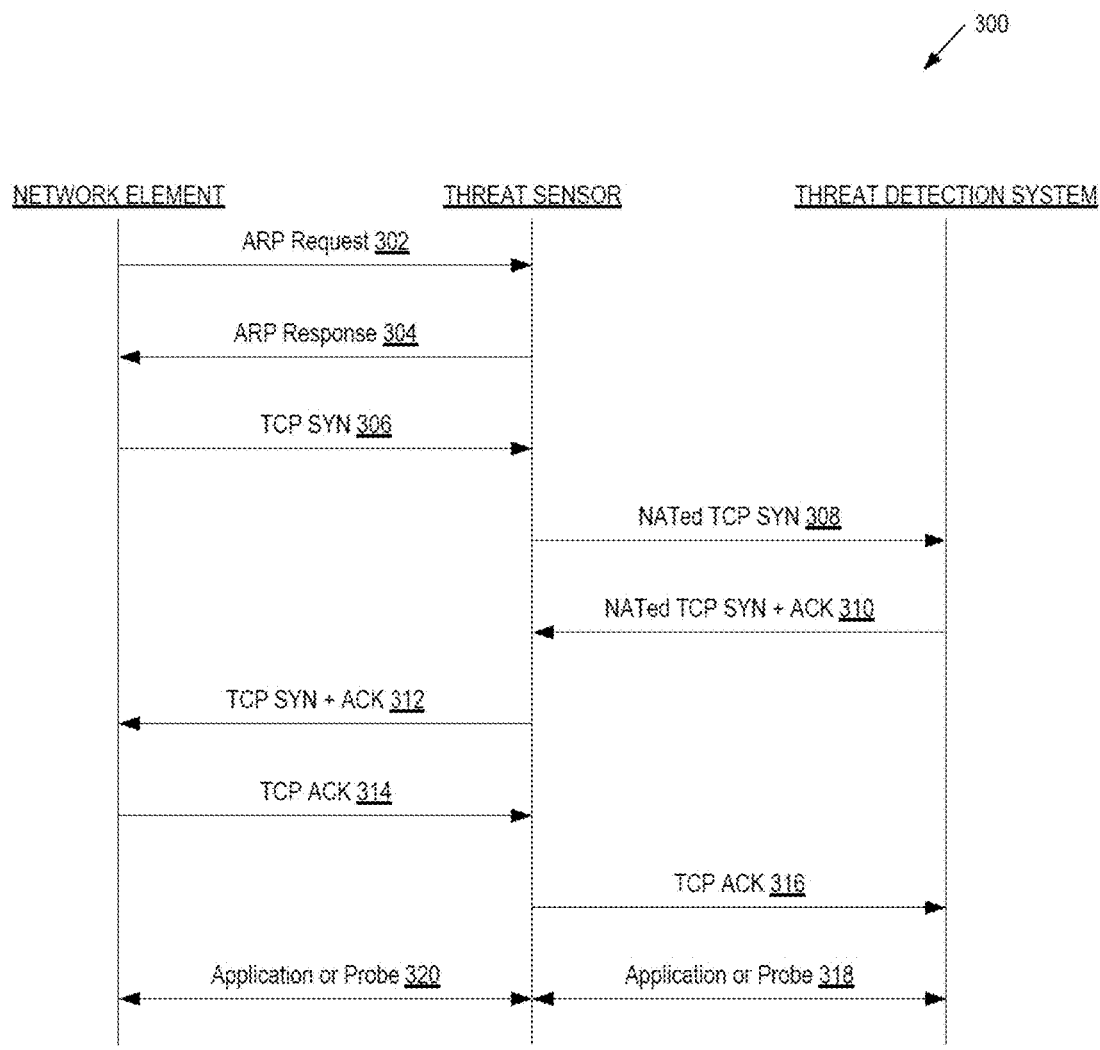
FIG. 3 illustrates an exemplary sequence of communications between a network element, a threat sensor, and a threat detection system.

FIG. 3 illustrates an exemplary sequence of communications 300 between a network element, a threat sensor, and a threat detection system. As discussed herein, threat sensor acts as the local responder for the probe or potential attack traffic from the network element. The probe or potential attack traffic is communicated by the threat sensor to the centralized threat detection system. In one embodiment, the threat sensor is configured as a local entity within a network segment, such as by assigning the threat sensor an IP address, a range of IP addresses, or an IP subnet, in the network segment.

As illustrated in FIG. 3, threat sensor receives 302 and responds 304 to local network scans, probes, or inquiries, such as address resolution protocol (ARP) requests or transmission control protocol (TCP) handshaking. The response 304 ensures that threat sensor appears to behave like a local host in the local network segment of the requesting network element.

After the initial probe and/or request, the requesting network element may try to establish IP connection 306 to the target service/server, which in the scenario of FIG. 3 is the threat sensor. The threat sensor could deny the connection and drop the packets if the requested services are not supported by the threat detection system. If the services are supported, the packets are forwarded 308 to the threat detection system. In one embodiment, the forwarding protocol utilized by threat sensor could include network address translation (NAT), which changes the source IP and port of the forwarding packets to the IP and port of the threat sensor, before forwarding the data packets to the threat detection system. In another embodiment, the forwarding protocol utilized by threat sensor could include tunneling, such as IP-IP or generic routing encapsulation (GRE) protocol, which encapsulates the external IP header on top of the original IP packets.

In either embodiment, once the threat detection system receives the IP packets, the emulation provided by the threat detection system would process and respond 310 to the network traffic, after which the response is translated and returned 312 to the requesting network element. The network element sends an acknowledgement 314 to the threat sensor, which is forwarded 316 to the threat detection system. The threat detection system may then monitor the behaviors of the network element through the exchange of application, service, request, or further probe messaging, illustrated as communications 318 and 320, to determine if the network element's messaging represent an attack/threat or normal traffic.

Though the threat detection system operates in a centralized location, which may be remote from one or more of a plurality of distributed threat sensors, the threat detection system provides services (via emulation) that appear to a requesting network element to be provided from a local server. Thus, the centralized threat detection system is able to monitor many distributed network segments for potential threats. The monitoring is also scalable, and may easily respond to the creation and destruction of network segments, via the distribution of lightweight threat sensors, and not with the distribution and deployment of new servers. That is, a large number of threat sensors can be deployed in numerous and distributed network segments to monitor for network probes or attacks, while deploying a centralized server or server cluster to execute one or more centralized threat detection systems. By separating presence of threat sensors from the server deployment on which the threat detection systems operate, the present embodiments take advantage of a scalable architecture to deploy threat monitoring with a simple management framework.

Figure 4:
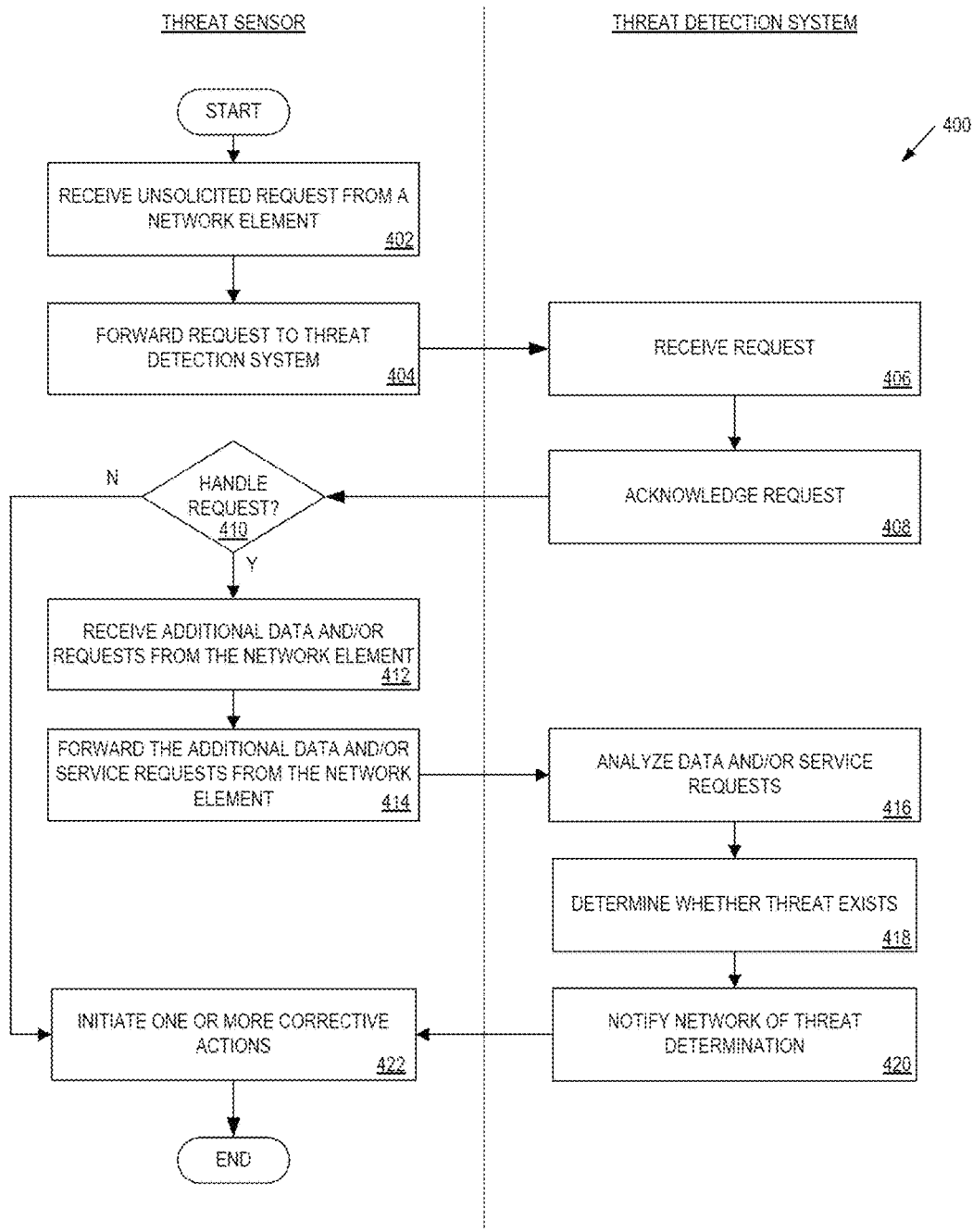
FIG. 4 is a flow diagram of one embodiment of a method for distributed threat detection.

FIG. 4 is a flow diagram of one embodiment of a method for distributed threat detection. The method 400 is performed by processing logic that may comprise hardware (circuitry, dedicated logic, etc.), software (such as is run on a general purpose computer system, networking device, or other dedicated machine), firmware, or a combination. In one embodiment, the method 400 is performed by threat sensor 210 and threat detection system 242 illustrated in FIG. 2, or any of threat sensors 120-1 through 120-N and threat detection system 142 illustrated in FIG. 1.

Referring to FIG. 4, processing logic begins by threat sensor receiving an unsolicited request from a network element (processing block 402). In one embodiment, the request is communicated on a network segment in which the network element and threat sensor are collocated. The threat sensor forwards the request to the threat detection system (processing block 404). As discussed in great detail below, prior to message forwarding, threat sensor may exchange one or more network handshaking or configuration messages with the network element and/or the threat detection system.

The threat detection system receives the request (processing block 406), and acknowledges the request (processing block 408). In one embodiment, where the request includes a request for a particular service, the acknowledgment may indicate whether the threat detection system is able to handle the request.

When the threat detection system is not able to handle the request (processing block 410), processing logic advances to processing block 422 where one or more corrective actions are initiated (processing block 422). In one embodiment, the corrective actions may include dropping the packets of the network element that initiated the request received at processing block 402. In another embodiment, the corrective actions may include notifying a network administrator of the potential threat, a potential identity of the threat, location of the threat, etc. to enable the network administrator to take further actions.

However, when the threat detection system is able to handle the request (processing block 410), the threat sensor receives additional data and/or requests from the network element (processing block 412). The additional data can include further requests and/or probes, requests to access resources, processing requests, etc. These are forwarded to the threat detection system (processing block 414).

The threat detection system then analyzes the data and/or service requests of the network element (processing block 416). In one embodiment, the analysis of the data and/or service requests can include emulating the requested service and the typical responses of the service. By impersonating the requested service, application, etc., the threat detection system is able to monitor and analyze the pattern of behavior exhibited by the network element to accurately determine when a threat is present (processing block 418).

The threat detection system notifies the threat sensor of the determination (processing block 420). The determination may reveal that the threat is non-existent, in which case the network element may be cleared. However, because of the original unsolicited request, which is itself suspicious, threat sensor may continue to monitor the network element. The threat sensor may then initiate one or more corrective actions based on the results of the threat determination (processing block 422).

Figure 5:
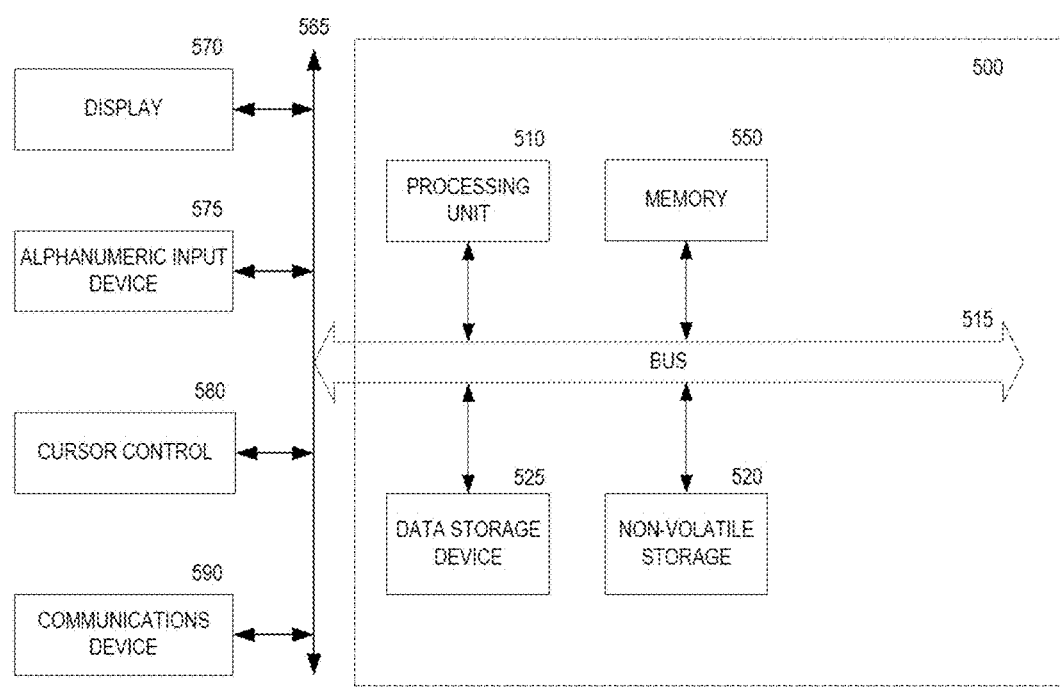
FIG. 5 illustrates a diagrammatic representation of a machine in the exemplary form of a computer system.

FIG. 5 is one embodiment of a computer system that may be used with the present invention. For example, computer systems as discussed in FIG. 5 may be utilized to execute one or more of the threat sensor and/or threat detection system. It will be apparent to those of ordinary skill in the art, however that other alternative systems of various system architectures may also be used.

The computer system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a cathode ray tube (CRT) or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "emulating", "receiving", "analyzing", "identifying", "determining", "disabling", or the like, refer to the actions and processes of a computer system, or similar electronic computing devices, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 6:
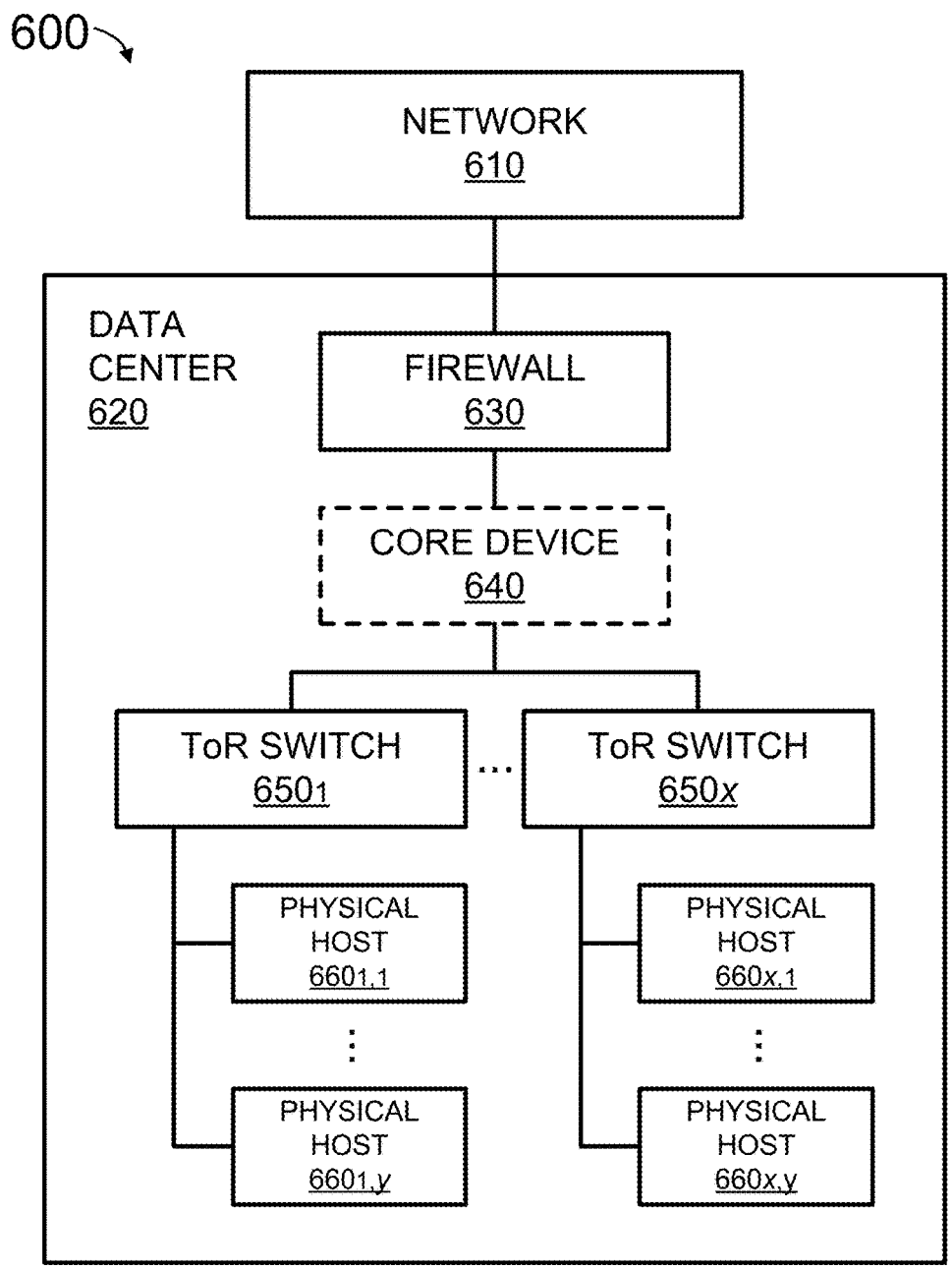
FIG. 6 is a simplified block diagram of a computing environment, according to some embodiments.

FIG. 6 illustrates a system 600 according to some embodiments. System 600 includes network 610 and data center 620. In various embodiments, data center 620 includes firewall 630, optional core switch/router (also referred to as a core device) 640, Top of Rack (ToR) switches $650_1$-$650_x$, and physical hosts $660_{1,1}$-$660_{x,y}$.

Network 610 (also referred to as a computer network or data network) is a telecommunications network that allows computers to exchange data. For example, in network 610, networked computing devices pass data to each other along data connections (e.g., network links). Data can be transferred in the form of packets. The connections between nodes may be established using either cable media or wireless media. For example, network 610 includes at least one of a local area network (LAN), wireless local area network (WLAN), wide area network (WAN), metropolitan area network (MAN), and the like. In some embodiments, network 610 includes the Internet.

Data center 620 is a facility used to house computer systems and associated components. Data center 620, for example, comprises computing resources for cloud computing services or operated for the benefit of a particular organization. Data center equipment, for example, is generally mounted in rack cabinets, which are usually placed in single rows forming corridors (e.g., aisles) between them. Firewall 630 creates a barrier between data center 620 and network 610 by controlling incoming and outgoing network traffic based on a rule set.

Optional core switch/router 640 is a high-capacity switch/router that serves as a gateway to network 610 and provides communications between ToR switches $650_1$ and $650_x$, and between ToR switches $650_1$ and $650_x$ and network 610. ToR switches $650_1$ and $650_x$ connect physical hosts $660_{1,1}$-$660_{1,y}$ and $660_{x,1}$-$660_{x,y}$ (respectively) together and to network 610 (optionally through core switch/router 640). For example, ToR switches $650_1$-$650_x$ use a form of packet switching to forward data to a destination physical host (of physical hosts $660_{1,1}$-$660_{x,y}$) and (only) transmit a received message to the physical host for which the message was intended.

In some embodiments, physical hosts $660_{1,1}$-$660_{x,y}$ are computing devices that act as computing servers such as blade servers. Computing devices are described further in relation to FIG. 14. For example, physical hosts $660_{1,1}$-$660_{x,y}$ comprise physical servers performing the operations described herein, which can be referred to as a bare-metal server environment. Additionally or alternatively, physical hosts $660_{1,1}$-$660_{x,y}$ may be a part of a cloud computing environment. Cloud computing environments are described further in relation to FIG. 14. By way of further non-limiting example, physical hosts $660_{1,1}$-$660_{x,y}$ can host different combinations and permutations of virtual and container environments (which can be referred to as a virtualization environment), which are described further below in relation to FIGS. 7-8.

Figure 7:
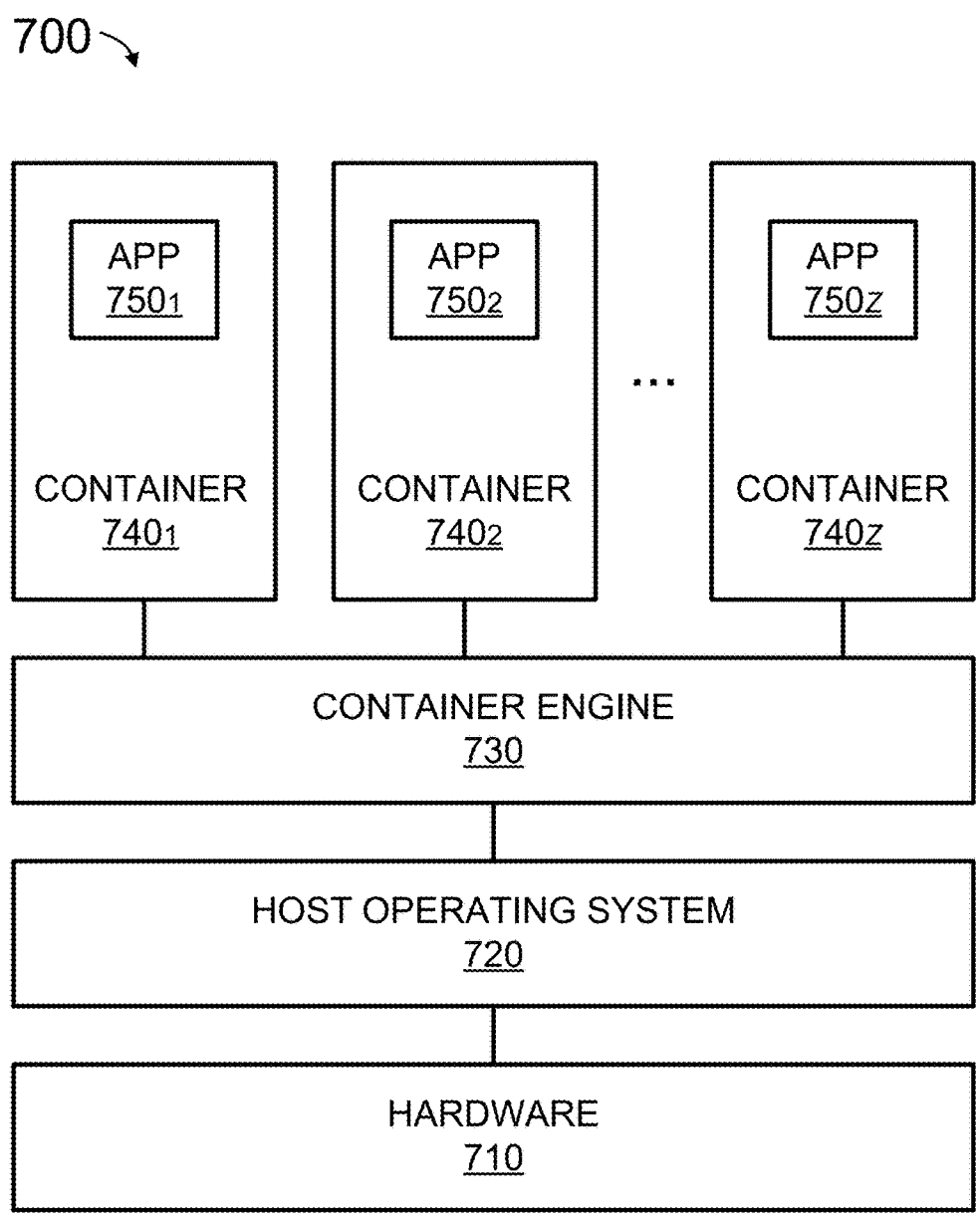
FIG. 7 is simplified block diagram of a container environment, according to various embodiments.

FIG. 7 depicts (container) environment 700 according to various embodiments. Environment 700 includes hardware 710, host operating system 720, container engine 730, and containers $740_1$-$740_Z$. In some embodiments, hardware 710 is implemented in at least one of physical hosts $660_{1,1}$-$660_{x,y}$ (FIG. 6). Host operating system 720 runs on hardware 710 and can also be referred to as the host kernel. By way of non-limiting example, host operating system 720 can be at least one of: Linux, Red Hat® Enterprise Linux® Atomic Enterprise Platform, CoreOS®, Ubuntu® Snappy, Pivotal Cloud Foundry®, Oracle® Solaris, and the like. Host operating system 720 allows for multiple (instead of just one) isolated user-space instances (e.g., containers $740_1$-$740_Z$) to run in host operating system 720 (e.g., a single operating system instance).

Host operating system 720 can include a container engine 730. Container engine 730 can create and manage containers $740_1$-$740_Z$, for example, using an (high-level) application programming interface (API). By way of non-limiting example, container engine 730 is at least one of Docker®, Rocket (rkt), Solaris Containers, and the like. For example, container engine 730 may create a container (e.g., one of containers $740_1$-$740_Z$) using an image. An image can be a (read-only) template comprising multiple layers and can be built from a base image (e.g., for host operating system 720) using instructions (e.g., run a command, add a file or directory, create an environment variable, indicate what process (e.g., application or service) to run, etc.). Each image may be identified or referred to by an image type. In some embodiments, images (e.g., different image types) are stored and delivered by a system (e.g., server side application) referred to as a registry or hub (not shown in FIG. 7).

Container engine 730 can allocate a filesystem of host operating system 720 to the container and add a read-write layer to the image. Container engine 730 can create a network interface that allows the container to communicate with hardware 710 (e.g., talk to a local host). Container engine 730 can set up an Internet Protocol (IP) address for the container (e.g., find and attach an available IP address from a pool). Container engine 730 can launch a process (e.g., application or service) specified by the image (e.g., run an application, such as one of APP $750_1$-$750_Z$, described further below). Container engine 730 can capture and provide application output for the container (e.g., connect and log standard input, outputs and errors). The above examples are only for illustrative purposes and are not intended to be limiting.

Containers $740_1$-$740_Z$ can be created by container engine 730. In some embodiments, containers $740_1$-$740_Z$ are each an environment as close as possible to an installation of host operating system 720, but without the need for a separate kernel. For example, containers $740_1$-$740_Z$ share the same operating system kernel with each other and with host operating system 720. Each container of containers $740_1$-$740_Z$ can run as an isolated process in user space on host operating system 720. Shared parts of host operating system 720 can be read only, while each container of containers $740_1$-$740_Z$ can have its own mount for writing. Each of containers $740_1$-$740_Z$ can be referred to as workloads and/or endpoints. Workloads can generally be various combinations and permutations of virtual machines, containers (e.g., containers $740_1$-$740_Z$ shown in FIG. 7), bare-metal servers (e.g., physical host $660_{1,1}$-$660_{x,y}$ shown in FIG. 6), and the like running an application or service.

Containers $740_1$-$740_Z$ can include one or more applications or services (APP) $750_1$-$750_Z$ (and all of their respective dependencies). APP $750_1$-$750_Z$ can be any application or service. By way of non-limiting example, APP $750_1$-$750_Z$ can be a database (e.g., Microsoft® SQL Server®, MongoDB, HTFS, MySQL®, Oracle® database, etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, Network File System (NFS), HTTP File Server (HFS), Apache® Hadoop®, etc.), service-oriented architecture (SOA) and/or microservices process, object-based storage (e.g., Lustre®, EMC® Centera®, Scality® RING®, etc.), directory service (e.g., Microsoft® Active Directory®, Domain Name System (DNS) hosting service, etc.), monitoring service (e.g., Zabbix®, Qualys®, HP® Business Technology Optimization (BTO; formerly OpenView), etc.), logging service (e.g., syslog-ng, Splunk®, etc.), and the like.

In contrast to hypervisor-based virtualization (e.g., virtual machines (VMs); not shown in FIG. 7), containers $740_1$-$740_Z$ may be an abstraction performed at the operating system (OS) level, whereas VMs are an abstraction of physical hardware. Since VMs can virtualize hardware, each VM instantiation can have a full server hardware stack from virtualized Basic Input/Output System (BIOS) to virtualized network adapters, storage, and central processing unit (CPU). The entire hardware stack means that each VM needs its own complete OS instantiation and each VM must boot the full OS.

Figure 8:
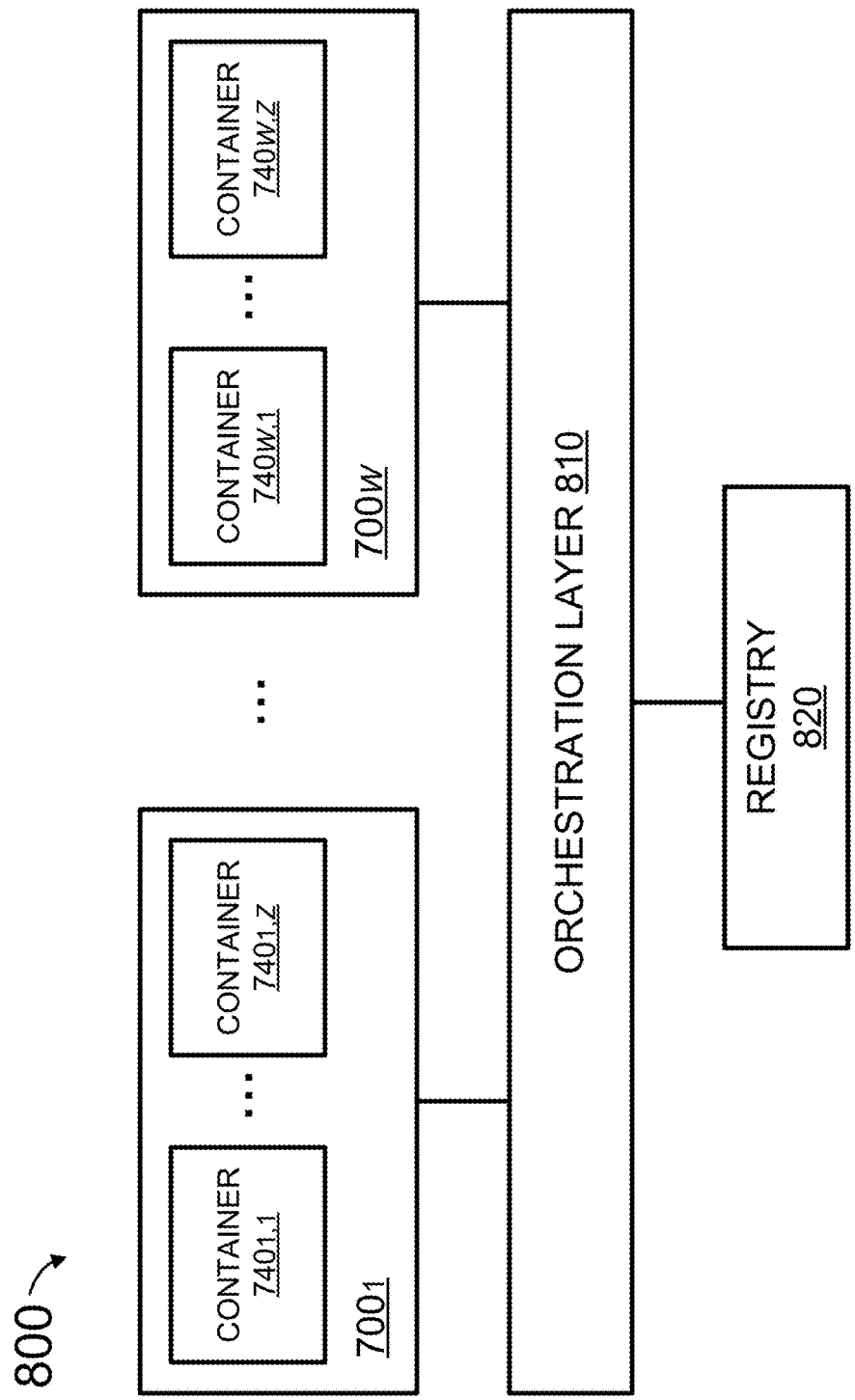
FIG. 8 is a higher-level view of the container environment of FIG. 2, in accordance with some embodiments.

FIG. 8 illustrates (container) environment 800, according to some embodiments. Environment 800 can include environments $700_1$-$700_W$ and orchestration layer 810. Environments $700_1$-$700_W$ can be instances of environment 700 (FIG. 7), include containers $740_{1,1}$-$740_{W,Z}$, and be in at least one of data center 620 (FIG. 6). Containers $740_{1,1}$-$740_{W,Z}$ (e.g., in a respective environment of environments $700_1$-$700_W$) can be a container as described in relation to containers $740_1$-$740_Z$ (FIG. 7).

Orchestration layer 810 can manage and deploy containers $740_{1,1}$-$740_{W,Z}$ across one or more environments $700_1$-$700_W$ in one or more data centers of data center 620 (FIG. 6). In some embodiments, to manage and deploy containers $740_{1,1}$-$740_{W,Z}$, orchestration layer 810 receives one or more image types (e.g., named images) from a data storage and content delivery system referred to as a registry (or hub) 820. By way of non-limiting example, registry 820 can be the Google Container Registry. In various embodiments, orchestration layer 810 determines which environment of environments $700_1$-$700_W$ should receive each container of containers $740_{1,1}$-$740_{W,Z}$ (e.g., based on the environments' $700_1$-$700_W$ current workload and a given redundancy target). Orchestration layer 810 can provide means of discovery and communication between containers $740_{1,1}$-$740_{W,Z}$. According to some embodiments, orchestration layer 810 runs virtually (e.g., in one or more containers $740_{1,1}$-$740_{W,Z}$ orchestrated by a different one of orchestration layer 810 and/or in one or more of a hypervisor (e.g., in a virtualization environment) and/or physically (e.g., in one or more physical hosts of physical hosts $660_{1,1}$-$660_{x,y}$ (FIG. 6) in one or more of data center 620). By way of non-limiting example, orchestration layer 810 is at least one of Docker Swarm®, Kubernetes®, Cloud Foundry® Diego, Apache® Mesos™, and the like.

Figure 9:
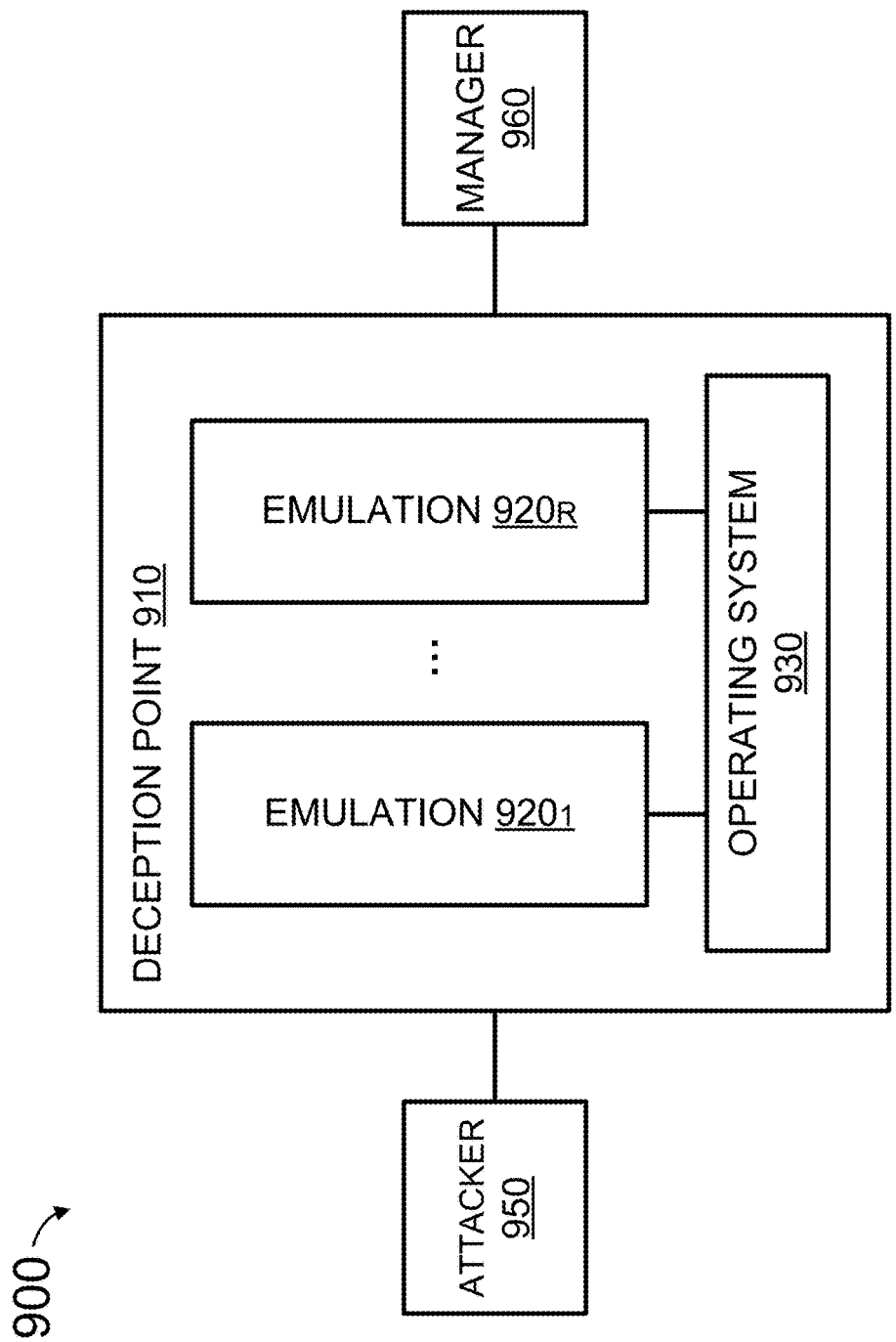
FIG. 9 is a simplified block diagram of a deception point environment, according to various embodiments.

FIG. 9 depicts a simplified block diagram of system 900, in accordance with some embodiments. System 900 may include deception point 910, attacker 950, and manager 960. In some embodiments, deception point 910, and manager 960 are in one or more of data center 620 (FIG. 6).

In some embodiments, deception point 910 comprises host operating system 930 and one or more emulations $920_1$-$920_R$. Host operating system 930 can be an operating system described above in relation to FIG. 7 (e.g., host operating system 720) and/or below in relation to FIG. 14. One or more emulations $920_1$-$920_R$ can run on host operating system 930. While seeming to provide at least some of the actual service, resources, data, etc. to attacker 950, emulations $920_1$-$920_R$ are a (isolated) decoy such that actual services, resources, data, etc. are not placed at risk (e.g., not made available to attacker 950). In some embodiments, emulations $920_1$-$920_R$ communicate with attacker 950 in such a way that the communications appear to originate from an actual workload/server, such as using Network Address Translation (NAT). Deception point 910 provides observation and/or logging of actions taken by attacker 950 accessing emulations $920_1$-$920_R$, as if emulations $920_1$-$920_R$ are an actual workload/server. For example, deception point 910 can monitor and record interactions of emulations $920_1$-$920_R$ with attacker 950, such as communications between deception point 910 and attacker 950, packet source address, packet source port, packet destination address, packet destination port, protocol, files uploaded and/or downloaded, and the like.

One or more emulations $920_1$-$920_R$ can be programs (e.g., running as daemons on host operating system 930) that emulate/imitate one or more actual workloads/servers in data center 620 (FIG. 6), such as a name server, time server, authentication server, web server, and the like. Daemons are a type of program that can run unobtrusively in the background (e.g., rather than under the direct control of a user), waiting to be activated by the occurrence of a specific event or condition.

The emulation/imitation can be rudimentary to sophisticated. By way of non-limiting example, (one of) emulations $920_1$-$920_R$ can provide a simple login window (e.g., user-name and password prompt) to learn what credential attacker 950 uses. By way of further non-limiting example, (one of) emulations $920_1$-$920_R$ include a fake hostname and emulate the shell of a Linux server to observe methodologies employed by attacker 950. (One of) Emulations $920_1$-$920_R$ can allow attacker 950 to load (and install) a file on deception point 910, and the file can subsequently be analyzed for malware. Malware can include a computer virus, worm, Trojan horse, ransomware, spyware, adware, scareware, and other malicious programs.

Each of emulations $920_1$-$920_R$ can be specifically developed to emulate a particular application and/or service. Moreover, particular implementations and versions of an application and/or service can be emulated. For example, an emulated http server can imitate one (and a version thereof) of: Apache® HTTP Server™, Microsoft® IIS), Nginx, Google Web Server (GWS), and the like. By way of further non-limiting example, an emulated directory service can be a particular one of (and a version thereof): Microsoft® Active Directory®, Domain Name System (DNS) hosting service, and the like. Other applications and services (and versions thereof) can be emulated. Since each of one or more emulations $920_1$-$920_R$ is custom developed to emulate a particular application and/or service (and a version thereof), the imitation can be rudimentary to sophisticated, depending on the complexity of a particular one of emulations $920_1$-$920_R$. However, writing/coding an emulation (e.g., one of emulations $920_1$-$920_R$) to support each of the numerous different applications and/or services (and versions thereof) can require an impractically large amount of time, money, and other resources.

In some embodiments, emulations $920_1$-$920_R$ provide multiple emulations/imitations using one identification (e.g., hostname, IP address, etc.). In various embodiments, emulations $920_1$-$920_R$ provide certain emulations/imitations using a particular identification (e.g., hostname, IP address, etc.) associated with the one or more emulations/imitations. By way of non-limiting example, a command-line login for SSH and a basic Apache® HTTP Server™ for HTTP can be provided using one identification or separate identifications (e.g., hostname, IP address, etc.).

Manager 960 can manage/configure (one or more of) deception point 910 (e.g., using a management port). For example, adding and/or removing an emulation of emulations $920_1$-$920_R$ running in deception point 910. Manager 960 can receive a log of incoming and/or outgoing packets (e.g., source address, source port, destination address, destination port, protocol, etc.) and the like from deception point 910.

Attacker 950 can be a computing system employed by one or more persons (unauthorized user or "hacker") who seek and exploit weaknesses in data center 620 (FIG. 6). In some embodiments, attacker 950 is a computing system described above in relation to FIG. 14. By way of non-limiting example, attacker 950 attempts to discover information about an intended target computer system and/or computer network, identify potential ways of attack, and compromise the system and/or network by employing the vulnerabilities found through the vulnerability analysis. By way of further non-limiting example, attacker 950 can disrupt the operation of and/or make unauthorized copies of sensitive information in data center 620, through unauthorized access of data center 620. Attacker 950 can be, for example, a computing system outside of data center 620 or a computing system inside data center 620 that was compromised by and under the control an unauthorized user.

Figure 10:
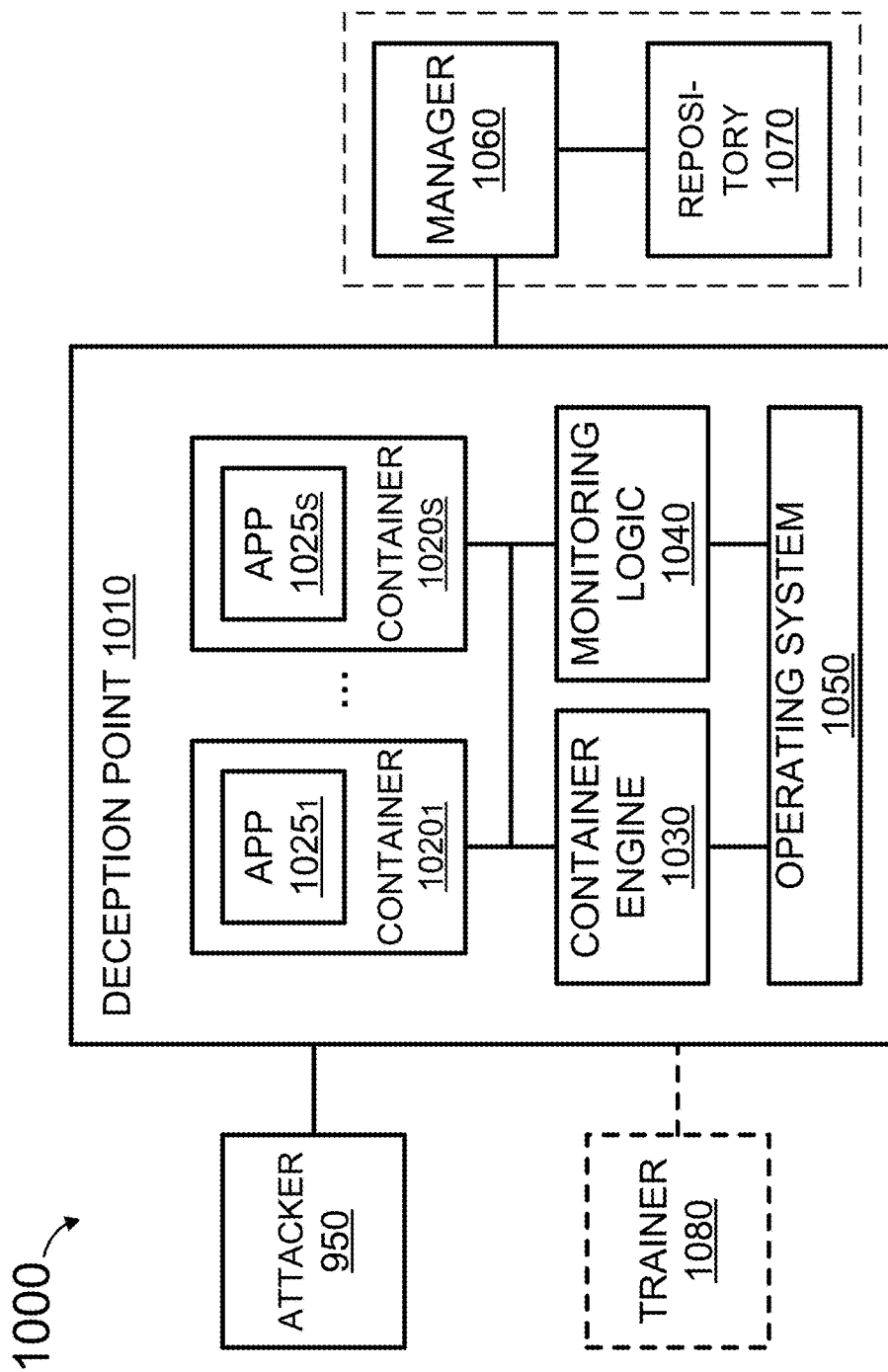
FIG. 10 is a simplified block diagram of a deception point environment, in accordance with some embodiments.

FIG. 10 depicts a simplified block diagram of system 1000, in accordance with some embodiments. FIG. 10 illustrates additional and/or alternative elements of system 900 shown in FIG. 9. System 1000 may include deception point 1010, attacker 950, manager 1060, repository 1070, and (optional) trainer 1080. In some embodiments, at least one of deception point 1010, manager 1060, repository 1070, and (optional) trainer 1080 are in one or more of data center 620 (FIG. 6). Applications (APP) $1025_1$-$1025_S$ have at least some of the characteristics of applications (APP) $750_1$-$750_Z$ described above in relation to FIG. 7. Manager 1060 has at least some of the characteristics of manager 960 described above in relation to FIG. 9. Attacker 950 was described above in relation to FIG. 9.

Deception point 1010 has at least some of the characteristics of deception point 910 described above in relation to FIG. 9. Deception point 1010 can be combinations and permutations of a computing system as described below in relation to FIG. 14, a bare-metal server (e.g., physical hosts physical hosts $660_{1,1}$-$660_{x,y}$ in FIG. 6), and a virtual machine. Additionally and/or alternatively, deception point 1010 can monitor and/or log one or more of the following behaviors: inbound and/or outbound network connections; creation of new, changes to, and removal of processes; creation of new, changes to, and removal of files and/or folders; memory usage changes; disk usage changes, network connection bonding of processes (e.g., which processes are listening to which/certain sockets and/or port, which processes initiate network connections, and the like), and the like. As described below, deception point 1010 can determine whether certain behaviors are benign or malicious.

In some embodiments, deception point 1010 comprises a host operating system 1050, container engine 1030, monitoring logic 1040, one or more containers $1020_1$-$1020_S$, and one or more applications and/or services $1025_1$-$1025_S$. Host operating system 1050, container engine 1030, one or more containers $1020_1$-$1020_S$, and one or more applications and/or services (APPs) $1025_1$-$1025_S$ can have at least some of the characteristics of host operating system 720 (and operating systems as described below in relation to FIG. 14), container engine 730, containers $740_1$-$740_Z$, and applications (APP) $750_1$-$750_Z$, respectively, as described above in relation to FIG. 7. In various embodiments, deception point 1010 can be run one or more of a bare-metal server (e.g., physical hosts $660_{1,1}$-$660_{,y}$ in FIG. 6) and a virtual machine.

For example, one or more applications and/or services (APP) $1025_1$-$1025_S$ can be any of applications and/or services (APP) $750_1$-$750_Z$ (FIG. 7). By way of further non-limiting example, one or more applications and/or services (APP) $1025_1$-$1025_S$ can be any of the applications or services emulated by emulations $920_1$-$920_R$ (FIG. 9). In some embodiments, applications and/or services (APP) $1025_1$-$1025_S$ include name servers, time servers, authentication servers, database servers, file servers, and the like. Name servers (e.g., Domain Name System (DNS) server, a server running Active Directory Domain Services (AD DS) called a domain controller, etc.) can implement a network service for providing responses to queries against a directory service. Time servers (e.g., Network Time Protocol (NTP) server) can read an actual time from a reference clock and distribute this information to client computers using a computer network. Authentication servers (e.g., Kerberos server, Terminal Access Controller Access-Control System (TACACS) server, Remote Authentication Dial-In User Service (RADIUS) server) provide a network service that applications use to authenticate the credentials, usually account names and passwords, of their users. Database servers provide database services to other computer programs or computers (e.g., database servers can run Microsoft® SQL Server®, MongoDB, HTFS, MySQL®, Oracle® database, etc.). File servers store, manage, and control access to separate files (e.g., file servers can run Linux server, Microsoft® Windows Server®, Network File System (NFS), HTTP File Server (HFS), Apache® Hadoop®, etc.).

In addition to or instead of emulations $920_1$-$920_R$ (FIG. 9) written specifically for deception point 910, deception point 1010 instantiates a container of an application and/or service to be emulated/imitated. In other words, one or more containers $1020_1$-$1020_S$ running one or more applications and/or services $1025_1$-$1025_S$ can function as a decoy (e.g., have at least some of the characteristics of emulations $920_1$-$920_R$). The same image used to provision the actual (production) application and/or service can also be used by deception point 1010 to emulate the application and/or service. Since a corresponding image is used to create containers for the actual (production) application and/or service, images for the actual (production) application and/or service are generally available when the actual (production) application and/or service is released. Thus, images for actual (production) applications and/or services can be readily available for use by deception point 1010.

For example, when it is desirable/advantageous to emulate an Apache® HTTP Server™ version 2.4.23 in deception point 1010, manager 1060 retrieves an image for Apache® HTTP Server™ version 2.4.23 from repository 1070. Using the Apache® HTTP Server™ version 2.4.23 image, container engine 1030 can create and manage a container (of containers $1020_1$-$1020_S$) (e.g., as described above in relation to FIG. 2) to run the Apache® HTTP Server™ version 2.4.23 instance. In this way, deception point 1010 can emulate an Apache® HTTP Server™ version 2.4.23 (using one or more containers $1020_1$-$1020_S$ running one or more applications and/or services $1025_1$-$1025_S$). Similarly, deception point 1010 can accurately emulate/imitate other applications and/or services—which have been containerized (e.g., set up to run in a container)—using the respective image for each (production) application and/or service.

Deception point 1010 can be said to emulate/imitate an application and/or service, insofar as deception point 1010 does not use real data. By way of non-limiting example, if the application and/or service is a customer database, then real customer information is not used by deception point 1010. By way of further non-limiting example, if the application and/or service is an authentication server, then provided usernames and/or passwords are checked against fake ones (or not really checked) and a fake cryptographic ticket is (automatically) provided. However, deception point 1010 can use the same containerized application and/or service image as a real production workload does.

Moreover, an image for each version of a particular (containerized) application and/or service can be available. When new version of an (containerized) application and/or service is released (e.g., for actual use), the corresponding image can be used for emulation/imitation by deception point 1010 (using one or more containers $1020_1$-$1020_S$ running one or more applications and/or services $1025_1$-$1025_S$).

Hence, custom software does not necessarily have to be written for each emulation (such as in emulations $920_1$-$920_R$ (FIG. 9)), saving time, money, and other resources. (Using one or more containers $1020_1$-$1020_S$ running one or more applications and/or services $1025_1$-$1025_S$) Deception point 1010 can offer the advantages of: extended/expanded coverage of applications and/or services which can be emulated/imitated and timely support for new (versions of) applications and/or services which can be emulated/imitated. Containers (e.g., containers $1020_1$-$1020_S$) in deception point 1010 can also offer advantages over other virtualization techniques. While deception point 1010 can run on a virtual machine, virtual machines should not be substituted for containers (e.g., containers $1020_1$-$1020_S$), because each virtual machine includes its own separate and complete operating system instantiation (in contrast to containers which share host operating system 1050 with monitoring logic 1040). Hence, virtual machines provide appreciably less visibility into actions taken by attacker 950 than containers $1020_1$-$1020_S$.

Monitoring logic 1040 can be an application(s) which monitors operation of (decoy) applications and/or services (APPs) $1025_1$-$1025_S$ in response to interactions with attacker 950. In some embodiments, monitoring logic 1040 is logically interposed between host operating system 10 and (decoy) applications and/or services (APPs) $1025_1$-$1025_S$. In some embodiments, monitoring logic 1040 can include one or more system monitors. For example, monitoring logic 1040 hooks (e.g., intercepts) library calls, function calls, messages, events, and the like passed between software components (e.g., in one or more containers $1020_1$-$1020_S$).

By way of further non-limiting example, monitoring logic 1040 includes (features and/or functions of) one or more of the following: an application programming interface (API), Linux/etc/ld.so.preload, ptrace (e.g., an abbreviation of "process trace," can be a system call used to allow one process to control another, enabling the controlling process to inspect and manipulate the internal state of the target process), a daemon which tracks changes to a file, strace (e.g., a program that traces/monitors interactions between processes in one or more containers $1020_1$-$1020_S$ and operating system 1050, which include system calls, signal deliveries, and changes of process state), struss (e.g., a program that traces system calls), tcpdump (e.g., a packets sniffer or package analyzer tool which is used to capture or filter TCP/IP packets that received transferred over a network on a specific interface(s)), and the like.

By way of further non-limiting example, monitoring logic 1040 launches a malware scanner (e.g., internal and/or external to monitoring logic 1040) to analyze suspect files which are (e.g., by attacker 950) uploaded (to deception point 1010), modified, and the like. For example, monitoring logic can send the suspect file to a malware scanner (e.g., inside and/or outside of data center 620 (FIG. 6). Alternatively or additionally, a hash function can be applied to the suspect file and the resulting hash can be used to retrieve an (prior) analysis of an identical (or similar) file performed internally or by a third-party such as VirusTotal. A hash function (e.g., MD5, SHA1, SHA256, and the like) can be a function which maps data of arbitrary size to data of fixed size, where the values returned by a hash function are referred to as hash values, hash codes, digests, or simply hashes.

In some embodiments, monitoring logic 1040 maintains a whitelist of legitimate/authorized actions and/or objects (e.g., DNS query, files of a particular type, URL, hash of an executable file, and the like) such that actions and/or objects not on the whitelist are at least one of: identified as potentially malicious, and further monitored and/or analyzed. An alert can be issued for behaviors not on the whitelist. For example, a (initial) whitelist can be produced using trainer 1080. Trainer 1080 can connect with deception point 1010 to emulate normal/expected user/client interaction with an actual workload (imitated by deception point 1010). Deception point 1010 can log the behaviors (e.g., changes to files, processes, and network connections) and provide the log to manager 1060. Manager 1060 can provide the log of behaviors to staff of an information technology (IT) organization (e.g., associated with deception point 1010) to identify benign behaviors. Behaviors classified as benign can be stored in the whitelist.

Monitoring logic 1040 can additionally or alternatively flag when a container crashes or check for a container crash (e.g., when a container of one or more containers $1020_1$-$1020_S$ stops functioning properly) and/or restarts, such as to (subsequently) identify the root cause. By way of additional non-limiting example, monitoring logic 1040 detects efforts (e.g., by attacker 950) to crash and/or detect/identify a container of one or more containers $1020_1$-$1020_S$. Monitoring logic 1040 can additionally or alternatively detect efforts (e.g., by attacker 950) to crash and/or detect/identify a container of one or more containers $1020_1$-$1020_S$. Monitoring logic 1040 can additionally or alternatively scan for patterns (e.g., represented using regular expressions) of an uploaded files (e.g., by attacker 950). By way of further non-limiting example, monitoring logic 1040 analyzes (or sends to manager 1060 for analysis) service logs produced by a container of one or more containers $1020_1$-$1020_S$.

Repository 1070 can be a public registry and/or a private registry. Registries and images were described above in relation to FIGS. 7 and 8. For example, a public registry can be a repository of images that are shared publicly, and a private registry can be a repository of images that are to be kept private. By way of further example, a public registry is the Google Container Registry and a private registry is a Docker private registry. According to some embodiments, repository 1070 is a data store included in manager 1060. In various embodiments, repository 1070 can store images that were evaluated for compatibility with deception point 1010 in an off-line manner (e.g., prior to instantiating the image(s) in deception point 1010). The evaluation is described below in relation to FIG. 12.

In some embodiments, manager 1060 can perform at least some of the operations of an orchestration layer (e.g., orchestration layer 810 (FIG. 8). For example, manager 1060 can get images associated with an application/service (APP) from repository 1070 and communicate with container engine 1030 to instantiate the application/service (APP) $1025_1$-$1025_S$ in a container of one or more containers $1020_1$-$1020_S$.

In some embodiments, various combinations and permutations of network communications devices (not depicted in FIG. 10)—such as (physical and/or virtual) firewalls, switches, routers, enforcement points, and the like—are (communicatively) interposed between attacker 950 and deception point 1010. For example, enforcement points can be a firewall service that provides network traffic filtering and monitoring for virtual machines, containers, bare-metal servers, and the like. Enforcement points are described further in related United States Patent Application "Methods and Systems for Orchestrating Physical and Virtual Switches to Enforce Security Boundaries" (application Ser. No. 14/677,827) filed Apr. 2, 2015, which is hereby incorporated by reference for all purposes. According to some embodiments, various combinations and permutations of network communications devices (not depicted in FIG. 10)—such as (physical and/or virtual) firewalls, switches, routers, enforcement points, jump servers (also known as a jump host or jumpbox), and the like—are (communicatively) interposed between deception point 1010 and manager 1060.

Figure 11:
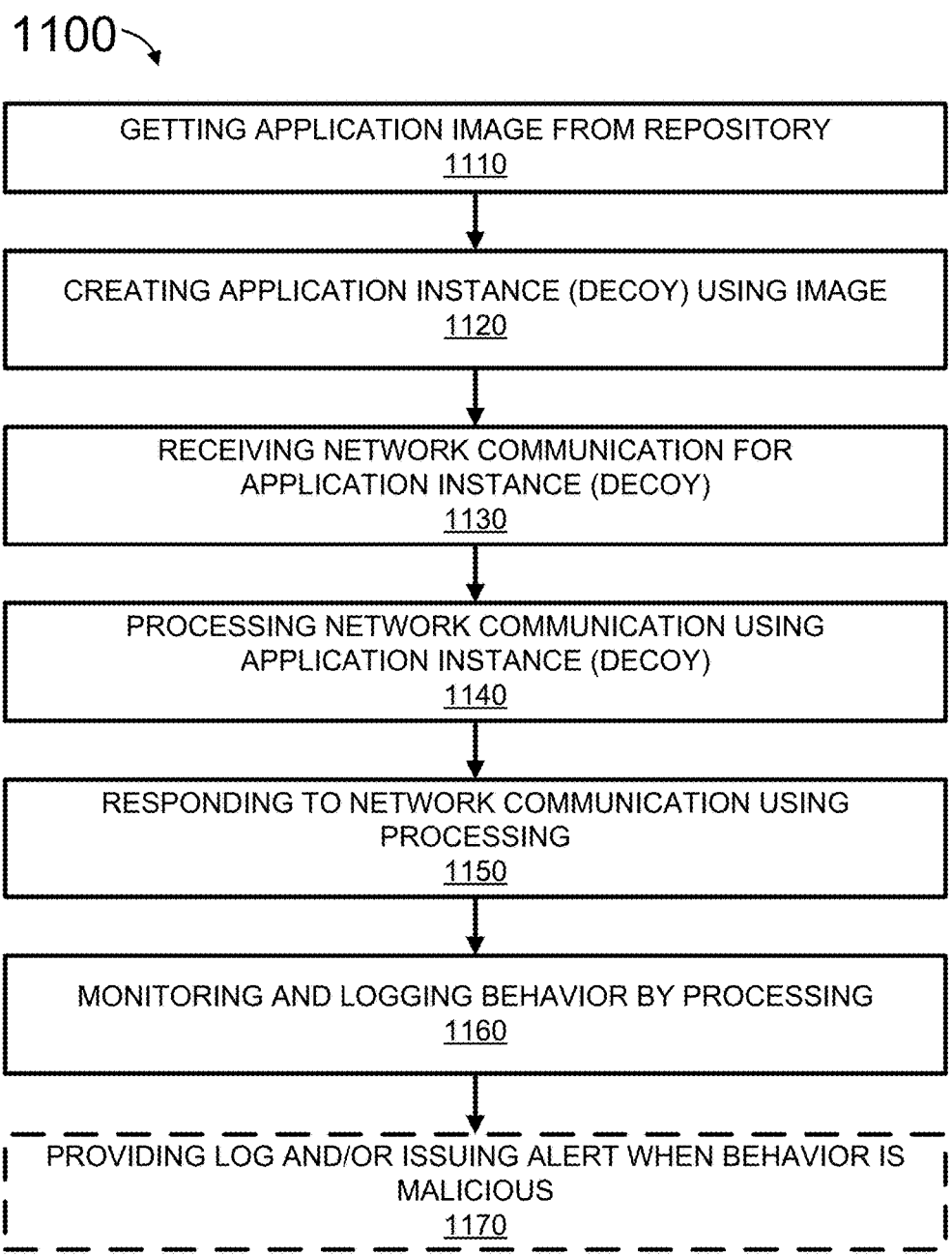
FIG. 11 is a simplified flow diagram of a method, according to various embodiments.

FIG. 11 is a simplified flow diagram for a method 1100 for emulating/imitating an application and/or service in a deception point (e.g., deception point 1010). In various embodiments, method 1100 is performed by deception point 1010. At step 1110, an image (e.g., basically a snapshot of a container) for an application and/or service is received. In various embodiments, the application image is received from manager 1060 (FIG. 10), where manager 1060 retrieves the application image from repository 1070.

At step 1120, a container with the application and/or service is instantiated. In some embodiments, container engine 1030 (FIG. 10) creates a container (e.g., one of containers $1020_1$-$1020_S$) for the application and/or service (e.g., one of APP $1025_1$-$1025_S$) using the image. The instantiated container (e.g., one of containers $1020_1$-$1020_S$) for the application and/or service (e.g., one of APP $1025_1$-$1025_S$) can function as a decoy.

At step 1130, a network communication is received and directed to the appropriate application and/or service. For example, the network communication is addressed to a particular application and/or service for which there is a decoy (e.g., container running the particular application and/or service) and the communication is provided to the container running the particular application and/or service. In various embodiments, attacker 950 accesses or uses the application and/or service imitated by the application and/or service in the container (functioning as a decoy). For example, the network communication can includes one or more commands, including instructions and data.

At step 1140, the network communication is processed using the application instance (operating as a decoy). In some embodiments, an instruction and data in the network communication is processed by one of application and/or service APP $1025_1$-$1025_S$. For example, one of application and/or service APP $1025_1$-$1025_S$ is a directory service and the network communication includes a query against the name service with a domain name and/or host name. By way of further non-limiting example, one of application and/or service APP $1025_1$-$1025_S$ is an authentication server which provides a network service for authenticating credentials and the network communication includes an account name and password. By way of additional non-limiting example, one of application and/or service APP $1025_1$-$1025_S$ is a web application which is a client-server software application in which the client (or user interface) runs in a web browser (e.g., running on a Red Hat® JBoss® application server) and the network communication includes input to the web application.

At step 1150, a response to the network communication is provided. In some embodiments, some output from the processing is sent to the originator of the network communication, such as attacker 950 (FIG. 9). For example, one of application and/or service APP $1025_1$-$1025_S$ is a directory service and the response includes a system-internal identification or addressing component, such as an IP address. By way of further non-limiting example, one of application and/or service APP $1025_1$-$1025_S$ is an authentication server and the response (e.g., when valid credentials are received) includes a (fake) cryptographic ticket for access to various services. By way of additional non-limiting example, one of application and/or service APP $1025_1$-$1025_S$ is a web application and the response includes output from the web application.

At step 1160, behavior arising from the processing is logged and monitored. In some embodiments, monitoring logic monitors behaviors/changes (e.g., inbound and outbound network connections; process creation, changes, and removal; file and directory creation, change, and removal; memory usage change; disk usage change; network connection bonding of processes; and the like) caused/made by the application and/or service (e.g., one of APP $1025_1$-$1025_S$) in response to the processing. In some embodiments, various combinations of steps 1140-1160 are performed concurrently and/or sequentially in any order.

Optionally at step 1170, a log including the received (potentially) malicious communication, the response, and other logged activity can be provided. For example, the log can be provided to manager 1060 (FIG. 10). By way of further non-limiting example, an alert of attack/intrusion may be provided to staff of an IT organization (e.g., associated with deception point 1010), such as through manager 1060. In some embodiments, behavior is (potentially) malicious when malware is detected in uploaded files; the monitored behavior is not in a whitelist; sensitive parts (e.g., name servers, time servers, authentication servers, database servers, file servers, and the like) of a network (e.g., data center 620 in FIG. 6) are accessed; and the like.

Optionally, steps 1130-1160 can be performed (e.g., concurrently and/or sequentially in any order) for a predetermined amount of time (e.g., specified in application image metadata as described below in relation to FIG. 12). When the predetermined amount of time has elapsed, deception point 1010 (FIG. 10) can re-initialize the application/service (e.g., return one of application and/or service APP $1025_1$-$1025_S$ to a default state), such as by erasing storage used by the container (e.g., one of containers $1020_1$-$1020_S$) and re-starting the container. In this way, the decoy can be ready for the next incoming connection (e.g., from attacker 950).

Figure 12:
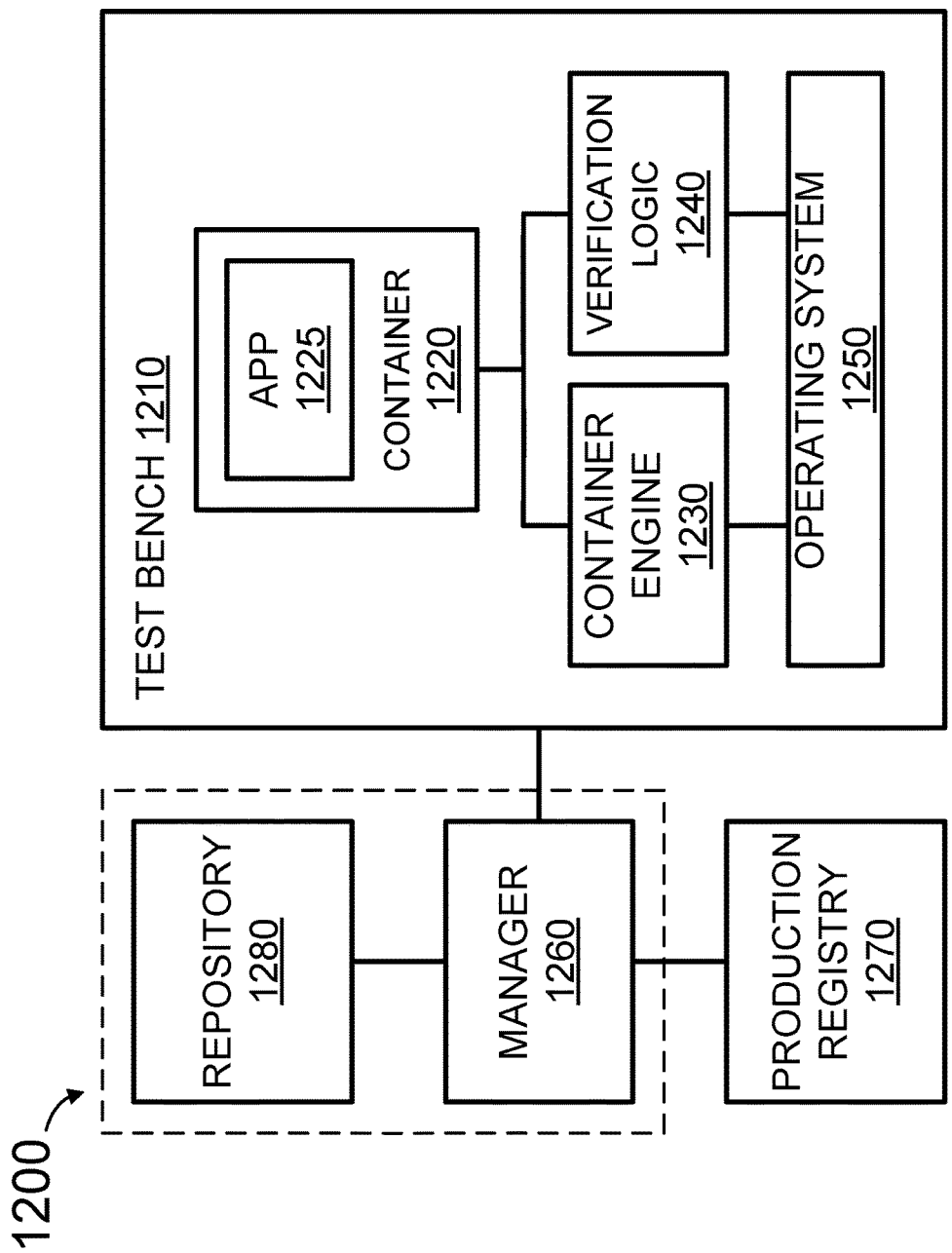
FIG. 12 is a simplified block diagram of a test system, according to various embodiments.

FIG. 12 depicts a simplified block diagram of system 1200, in accordance with some embodiments. FIG. 12 illustrates additional and/or alternative elements of system 1000 shown in FIG. 10. System 1200 may include test bench 1210, manager 1260, production registry 1270, and repository 1280. In some embodiments, at least one of test bench 1210, manager 1260, production registry 1270, and repository 1280 are in one or more of data center 620 (FIG. 6). Manager 1260 has at least some of the characteristics of manager 1060 described above in relation to FIG. 10). For example, manager 1260 gets an image associated with an application/service (APP) 1225 from production registry 1270 and communicates with container engine 1230 to instantiate the application/service (APP) 1225 in container 1220. Repository 1280 has at least some of the characteristics of repository 1070 described above in relation to FIG. 10.

Test bench 1210 can be combinations and permutations of a computing system as described below in relation to FIG. 14, a bare-metal server (e.g., physical hosts physical hosts $660_{1,1}$-$660_{x,y}$ in FIG. 6), and a virtual machine. In some embodiments, test bench 1210 comprises host operating system 1250, container engine 1230, verification logic 1240, containers 1220, and application and/or service 1225. Host operating system 1250, container engine 1230, container 1220, application and/or service (APP) 1225 can have at least some of the characteristics of host operating system 1050 (and operating systems as described below in relation to FIG. 14), container engine 1030, containers $1020_1$-$1020_S$, and applications (APP) $1025_1$-$1025_S$, respectively, as described above in relation to FIG. 10.

Verification logic 1240 can be an application which checks compatibility between application and/or service (APP) 1225 and deception point 1010 (FIG. 10). In some embodiments, verification logic 1240 is logically interposed between host operating system 1250 and application and/or service (APP) 1225. Verification logic 1240 can perform a check and/or test of application and/or service (APP) 1225 for compatibility (e.g., proper operation) in deception point 1010. For example, verification logic 1240 analyzes characteristics of an image (e.g., retrieved from production registry 1270) associated with application and/or service (APP) 1225 to ensure compatibility.

By way of further non-limiting example, verification logic 1240 applies monitoring logic 1040 to application and/or service (APP) 1225 and checks that one or more hooks of monitoring logic 1040 (described above in relation to FIG. 10) operate properly with application and/or service (APP) 1225. Once verification logic 1240 determines application and/or service (APP) 1225 is compatible with deception point 1010, the image associated with application and/or service (APP) 1225 can be stored in repository 1280. The image can be stored with associated metadata, such as an application name, listening ports, and time for deception after an incoming connection. For example, the application name is a name of application/service associated with the image, the listening ports are one or more ports the application/service listens on, and the time for deception after an incoming connection is a predetermined amount of time the application and/or service instantiated in a container (e.g., the application/service (APP) $1025_1$-$1025_S$ in FIG. 10) imitates an actual application/service. In some embodiments, when the time for deception has elapsed, storage used by the container is cleaned up (e.g., erased) and the container re-started.

Production registry 1270 can include images from a public registry and/or a private registry, where the images have been examined by staff of an information technology (IT) organization (e.g., associated with deception point 1010) and approved for actual use (e.g., used in one or more of data centers 620 (FIG. 6) to provide an application and/or service. Registries and images were described above in relation to FIGS. 7, 8, and 10.

Figure 13:
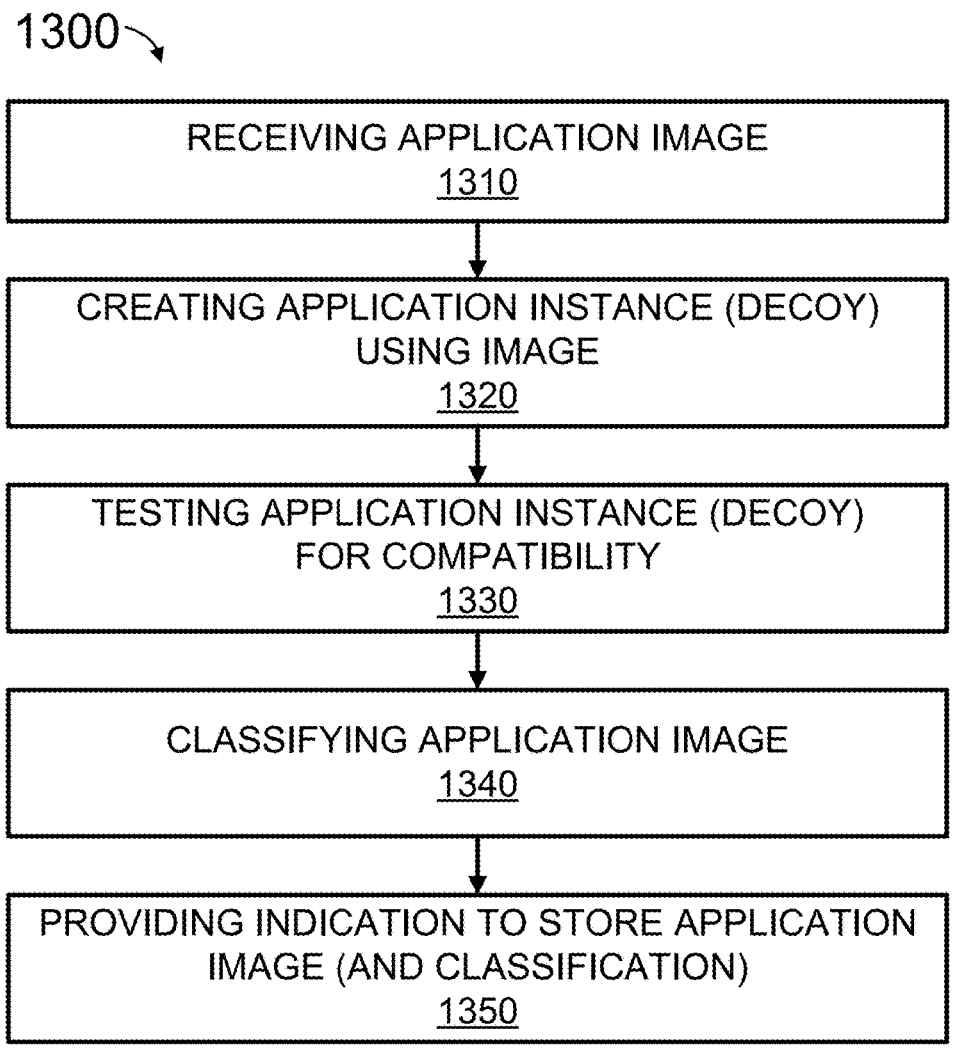
FIG. 13 is a simplified flow diagram of a method, in accordance with some embodiments.

FIG. 13 is a simplified flow diagram for a method 1300 for evaluating compatibility of an image with a deception point (e.g., deception point 1010). In various embodiments, method 1300 is performed by test bench 1210 (FIG. 12). At step 1310, an image for an application and/or service is received. In various embodiments, the image is received from manager 1260, where manager 1260 retrieves the image from production registry 1270. For example, production registry 1270 is where the IT organization stores application images for applications/services approved for actual use in the network (e.g., data center 620 in FIG. 6). Optionally, manager 1260 can also store a local copy of the application image in memory or a data store of manager 1260.

At step 1320, a container with the application and/or service is instantiated. In some embodiments, container engine 1230 (FIG. 12) creates container 1220 for the application and/or service APP 1225 using the image. For example, container 1220 for the application and/or service APP 1225 is to be tested for operation as a decoy.

At step 1330, the container with the application and/or service is tested for compatibility with a deception point. In some embodiments, container 1220 with application and/or service (APP) 1225 is tested using verification logic 1240 for compatibility with deception point 1010 (FIG. 10). For example, characteristics of the image can be analyzed for compatibility with deception point 1010. By way of further non-limiting example, one or more hooks can be applied to the application and/or service (APP) 1225 in container 1220 and success/failure determined for each hook.

At step 1340, the image is classified and/or scored. In some embodiments, the image is classified as at least one of incompatible, partially compatible, and compatible, using the results of the testing. Alternatively, the image can be scored using a range of numbers (e.g., 1-10, 1-100, and the like) and/or letters (e.g., A, B, C, D, and F), where incompatible, partially compatible, and fully compatible correspond to a predetermined range of numbers and/or letters. For example, a score of 10, 100, and A are fully compatible; a score of 5-9, 50-99, and C-B are partially compatible; and a score of 1-4, 1-49, and F-D are incompatible. In various embodiments, a partial compatibility classification and/or score denotes for each monitoring feature which are compatible and/or incompatible with the image. Other ranges of numbers, letters, and predetermined ranges for classification can be used. The classification and/or score can be provided to manager 1260 (FIG. 12).

At step 1350, an indication to store the application image (and optionally the classification) are provided. In some embodiments, an indication to store the application image (e.g., the application image itself, a request, message, instruction, flag, tag, and the like) is provided to manager

1260 (FIG. 12). Manager 1260 can store the (partially compatible and/or fully compatible) image and optionally the classification in repository 1280. For example, the application image can be provided to manager 1260 (for storage in repository 1280). Alternatively or additionally, manager 1260 retrieves a copy of the application image from production registry 1270 (for storage in repository 1280). Alternatively or additionally, manager 1260 can store a local copy of the application image in repository 1280. In various embodiments, the image is stored with metadata indicating its compatibility classification and/or score. Additionally or alternatively, other metadata associated with the image, such as an application name, listening ports, and time for deception after an incoming connection, can be stored in repository 1280 with the image.

Figure 14:
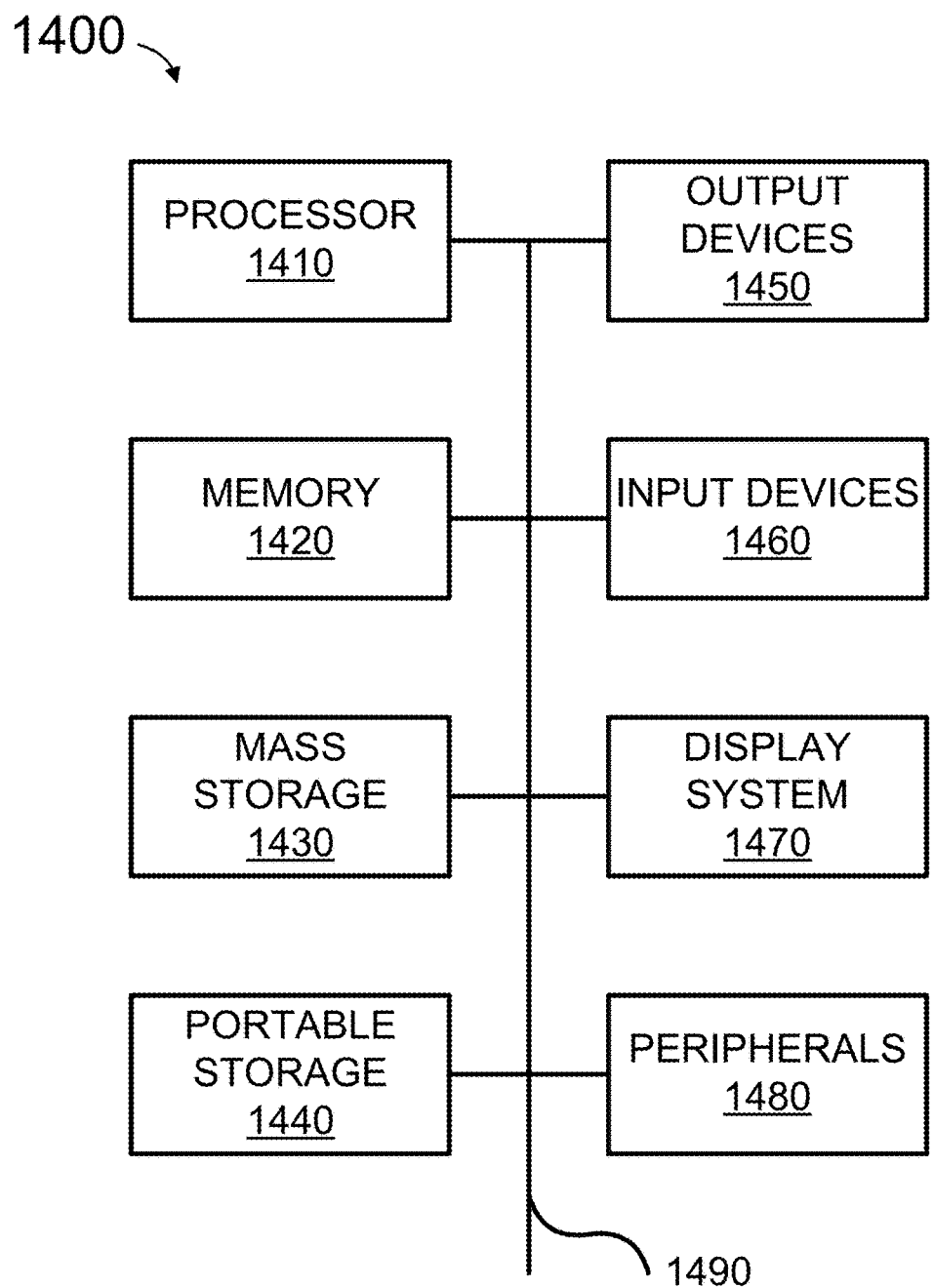
FIG. 14 is a simplified block diagram of a computing system, according to various embodiments.

FIG. 14 illustrates an exemplary computer system 1400 that may be used to implement some embodiments of the present invention. The computer system 1400 in FIG. 14 may be implemented in the contexts of the likes of computing systems, networks, servers, or combinations thereof. The computer system 1400 in FIG. 14 includes one or more processor unit(s) 1410 and main memory 1420. Main memory 1420 stores, in part, instructions and data for execution by processor unit(s) 1410. Main memory 1420 stores the executable code when in operation, in this example. The computer system 1400 in FIG. 14 further includes a mass data storage 1430, portable storage device 1440, output devices 1450, user input devices 1460, a graphics display system 1470, and peripheral device(s) 1480.

The components shown in FIG. 14 are depicted as being connected via a single bus 1490. The components may be connected through one or more data transport means. Processor unit(s) 1410 and main memory 1420 are connected via a local microprocessor bus, and the mass data storage 1430, peripheral device(s) 1480, portable storage device 1440, and graphics display system 1470 are connected via one or more input/output (I/O) buses.

Mass data storage 1430, which can be implemented with a magnetic disk drive, solid state drive, or an optical disk drive, is a non-volatile storage device for storing data and instructions for use by processor unit(s) 1410. Mass data storage 1430 stores the system software for implementing embodiments of the present disclosure for purposes of loading that software into main memory 1420.

Portable storage device 1440 operates in conjunction with a portable non-volatile storage medium, such as a flash drive, floppy disk, compact disk, digital video disc, or Universal Serial Bus (USB) storage device, to input and output data and code to and from the computer system 1400 in FIG. 14. The system software for implementing embodiments of the present disclosure is stored on such a portable medium and input to the computer system 1400 via the portable storage device 1440.

User input devices 1460 can provide a portion of a user interface. User input devices 1460 may include one or more microphones, an alphanumeric keypad, such as a keyboard, for inputting alphanumeric and other information, or a pointing device, such as a mouse, a trackball, stylus, or cursor direction keys. User input devices 1460 can also include a touchscreen. Additionally, the computer system 1400 as shown in FIG. 14 includes output devices 1450. Suitable output devices 1450 include speakers, printers, network interfaces, and monitors.

Graphics display system 1470 include a liquid crystal display (LCD) or other suitable display device. Graphics display system 1470 is configurable to receive textual and graphical information and processes the information for output to the display device.

Peripheral device(s) 1480 may include any type of computer support device to add additional functionality to the computer system.

The components provided in the computer system 1400 in FIG. 14 are those typically found in computer systems that may be suitable for use with embodiments of the present disclosure and are intended to represent a broad category of such computer components that are well known in the art. Thus, the computer system 1400 in FIG. 14 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1400 may be implemented as a cloud-based computing environment, such as a virtual machine operating within a computing cloud. In other embodiments, the computing system 1400 may itself include a cloud-based computing environment, where the functionalities of the computing system 1400 are executed in a distributed fashion. Thus, the computing system 1400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1400, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
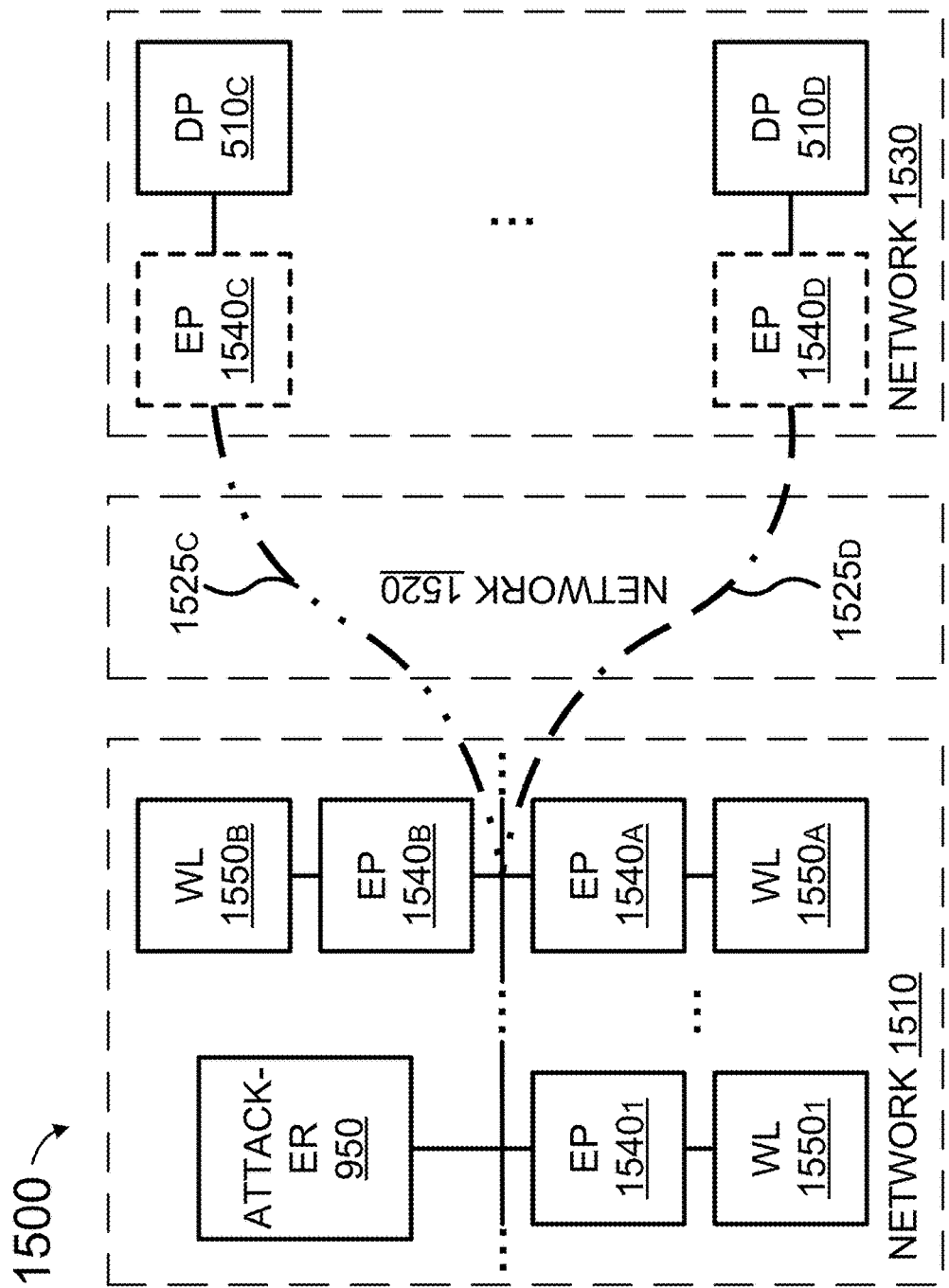
FIG. 15 is a simplified block diagram of a system, according to some embodiments.

FIG. 15 depicts a simplified block diagram of system 1500, in accordance with some embodiments. System 1500 can include at least some of the elements of system architecture 100, system 600, system 900, and system 1000, as shown in FIGS. 1, 6, 9, and 10, respectively. System 1500 may include network 1510, network 1520, network 1530, enforcement points $1540_1$-$1540_D$, and workloads $1550_1$-$1550_B$, attacker 950, and one or more deception points $510_C$-$510_D$.

In various embodiments, enforcement points $1540_1$-$1540_B$ and workloads $1550_1$-$1550_B$ are in network 1510. Network 1510 can be (physically and/or virtually) partitioned into subnetworks, network segments, and the like, for example, using various combinations and permutations of (physical and/or virtual): switches, routers, firewalls, enforcement points (e.g., enforcement points $1540_1$-$1540_B$), and the like. Network 1510 can comprise critical application infrastructure. Critical application infrastructure can be one or more of workloads $1550_1$-$1550_B$ in one or more data centers (e.g., data center 620 in FIG. 6) providing important/essential services. By way of non-limiting example, workloads $1550_1$-$1550_B$ and enforcement points $1540_1$-$1540_B$ include combinations and permutations of physical hosts (e.g., physical hosts $660_{1,1}$-$660_{x,y}$ shown in FIG. 6; also referred to as "bare metal" servers), Virtual Machines (e.g., VMs described in relation to FIG. 1), containers (e.g., containers $740_1$-$740_Z$ shown in FIG. 7), and the like.

By way of non-limiting example, network 1510 comprises various combinations and permutations of name servers, time servers, authentication servers, database servers, file servers, and the like. Some of the servers of network 1510 can be bastion hosts. A bastion host is a special purpose computer on a network specifically designed and configured to withstand attacks. The bastion host can host a single application, for example a proxy server, and all other services are removed or limited to reduce the threat to the computer. Name servers (e.g., Domain Name System (DNS) server, a server running Active Directory Domain Services (AD DS) called a domain controller, etc.) can implement a network service for providing responses to queries against a directory service. Time servers (e.g., Network Time Protocol (NTP) server) can read an actual time from a reference clock and distribute this information to client computers using a computer network.

Authentication servers (e.g., Kerberos server, Terminal Access Controller Access-Control System (TACACS) server, Remote Authentication Dial-In User Service (RADIUS) server) provide a network service that applications use to authenticate the credentials, usually account names and passwords, of their users. Database servers provide database services to other computer programs or computers (e.g., database servers can run Microsoft® SQL Server®, MongoDB, HTFS, MySQL®, Oracle® database, etc.). File servers store, manage, and control access to separate files (e.g., file servers can run Linux server, Microsoft® Windows Server®, Network File System (NFS), HTTP File Server (HFS), Apache® Hadoop®, etc.).

Enforcement points $1540_1$-$1540_D$ can have at least some of the characteristics of threat sensors 120-1-120-N and threat sensor 210 described above in relation to FIGS. 1-4. According to some embodiments, enforcement points (e.g., enforcement points $1540_1$-$1540_D$) provide network traffic filtering and monitoring for workloads (e.g., workloads $1550_1$-$1550_B$) and/or one or more deception points (e.g., deception points $510_C$-$510_D$). For example, enforcement points control network traffic to and from a workload using a (low-level) rule set. A rule, for example, allows a connection to a specific (IP) address, allows a connection to a specific (IP) address if the connection is secured (e.g., using IPsec), denies a connection to a specific (IP) address, redirects a connection from one IP address to another IP address (e.g., to one or more deception points $510_C$-$510_D$), logs communications to and/or from a specific IP address, and the like. Each address is virtual, physical, or both. Connections are incoming to the respective workload, outgoing from the respective workload, or both. By way of further non-limiting example, a rule can distinguish data communications from each other (e.g., permitted versus unauthorized access) using characteristic of a TCP/IP connection, such as a source address (e.g., IP address), source port number, destination address (e.g., IP address), destination port, and protocol in use, which can be referred to as a 5-tuple. Rules can be produced using a high-level security policy.

Although each of enforcement points $1540_1$-$1540_B$ and $1540_C$-$1540_D$ is shown communicatively coupled to one of workloads $1550_1$-$1550_B$ and deception points $510_C$-$510_D$ (respectively), each enforcement point can be communicatively coupled to more than one workload and/or deception point.

Attacker 950 was described above in relation to FIGS. 9 and 10. Although depicted within network 1510, attacker 950 can operate within network 1510 through a security-compromised workload (e.g., workload of workloads $1550_1$-$1550_B$), originate (e.g., be located physically) outside of network 1510, send (network data) communications (e.g., data packets) to and/or over network 1510, and the like.

In some embodiments, an enforcement point (e.g., enforcement point of enforcement points $1540_1$-$1540_B$) can determine when a received (network data) communication (e.g., packet) is malicious (e.g., being used by attacker 950 for unauthorized access of workloads in network 1510). For example, there can be one or more rules to redirect malicious (network data) communications, each rule identifying malicious communications using characteristics of the malicious communications (e.g., based on the packet's 5-tuple). In this way, enforcement points (e.g., enforcement points $1540_1$-$1540_B$) can analyze a (network data) communication (e.g., packet) to determine whether the communication is malicious.

By way of further non-limiting example, an enforcement point can determine a communication is malicious using a predefined attack signature (e.g., Intrusion Detection and Prevention (IDP) signature). A predefined attack signature can include a (stateful) attack pattern (e.g., a pattern that exists within a specific section of the attack) to detect known attacks. A predefined attack signature can comprise an attack context (e.g., packet), attack direction (e.g., client-to-server and/or server-to-client traffic), attack pattern, service or application used (e.g., AOL Instant Messenger (AIM), Border Gateway Protocol (BGP), Character Generator Protocol (chargen), Dynamic Host Configuration Protocol (DHCP), Discard protocol, Domain Name System (DNS), Echo, Finger, File Transfer Protocol (FTP), Gnutella, Gopher, H.225.0/RAS (Registration, Admission, and Status), Hyper-Text Transfer Protocol (HTTP), Internet Control Message Protocol (ICMP), Identification protocol (IDENT), Internet Key Exchange protocol (IKE), Internet Message Access Protocol (IMAP), Internet Relay Chat (IRC), Lightweight Directory Access Protocol (LDAP), MySQL, Network File System (NFS), Network Time Protocol (NTP), RLOGIN, RSH, Real-Time Streaming Protocol (RTSP), Session Initiation Protocol (SIP), Simple Mail Transfer Protocol (SMTP), Simple Network Management Protocol (SNMP), SSH, Telnet, and the like), action (e.g., forward (e.g., to a particular deception point), drop, and the like), and protocol-specific parameters (e.g., Transmission Control Protocol (TCP), User Datagram Protocol (UDP), Internet Control Message Protocol (ICMP), and Internet Protocol (IP) header fields).

In some embodiments, when an enforcement (e.g., enforcement point of enforcement points $1540_1$-$1540_B$) determines a communication is (potentially) malicious, the enforcement point redirects the malicious communication to a deception point (e.g., of deception points $510_C$-$510_D$). By way of non-limiting example, workload $1550_B$ is a DNS server and enforcement point $1540_B$ will redirect a malicious communication (addressed to workload $1550_B$) to deception point $510_C$ which includes a DNS server decoy. By way of further non-limiting example, workload $1550_B$ is a database server and enforcement point $1540_B$ will redirect a malicious communication addressed to workload $1550_B$ instead to deception point $510_D$ which includes a database server decoy. Other applications and/or services (e.g., being a particular version thereof and/or from particular vendors/organizations) and corresponding decoys can be used.

According to various embodiments, when an enforcement point (e.g., of enforcement points $1540_1$-$1540_B$) redirects the (potentially) malicious communication to a deception point (e.g., of deception points $510_C$-$510_D$), the malicious communication is sent over network 1520, for example, using encapsulation (also known as tunneling, such as Virtual Extensible LAN (VXLAN), Cisco® Generic Routing Encapsulation (GRE), etc.) depicted by tunnels $1525_C$ and $1525_D$. By way of further non-limiting example, enforcement point $1540_B$ embeds/encapsulates each packet to be forwarded (e.g., having a destination address and/or port of workload $1550_B$) inside another packet (e.g., having a destination address and/or port of deception point $510_C$). Encapsulation can offer the benefit of preserving the original packet to be forwarded.

Network 1520 can include various combinations and permutations of (physical and/or virtual): switches, routers, firewalls, enforcement points (e.g., enforcement points $1540_1$-$1540_B$), and the like (not shown in FIG. 15). Additionally and/or alternatively, network 1520 can include various combinations and permutations of physical hosts (e.g., physical hosts $660_{1,1}$-$660_{x,y}$ shown in FIG. 6; also referred to as "bare metal" servers), Virtual Machines (e.g., VMs described in relation to FIG. 1), containers (e.g., containers $740_1$-$740_Z$ shown in FIG. 7), and the like.

Network 1530 can include various combinations and permutations of (physical and/or virtual): switches, routers, firewalls, enforcement points (e.g., enforcement points $1540_1$-$1540_B$), and the like. Additionally and/or alternatively, network 1520 can include various combinations and permutations of physical hosts (e.g., physical hosts $660_{1,1}$-$660_{x,y}$ shown in FIG. 6; also referred to as "bare metal" servers), Virtual Machines (e.g., VMs described in relation to FIG. 1), containers (e.g., containers $740_1$-$740_Z$ shown in FIG. 7), and the like.

Each of networks 1510, 1520, and 1530 can be in the same or different subnetwork (subnet). Workloads belonging to a subnetwork are addressed with a common/identical most-significant bit-group in their IP address. For example, networks 1510, 1520, and 1530 can be in various combinations and/or permutations of physically and/or logically separated and/or grouped. By way of further non-limiting example, networks 1510, 1520, and 1530 can be in various combinations and/or permutations of the same or different data center (e.g., data center 620 in FIG. 6), rack cabinet in the data center, and the like.

According to some embodiments, network 1530 includes at least one deception point $510_C$-$510_D$ and (optionally) at least one enforcement point $1540_C$-$1540_D$. Deception points (e.g., deception point $510_C$-$510_D$) have at least some of the characteristics of threat detection system 142 and 242, and deception point 910 and 1010 described above in FIGS. 1-3 and 9-11, respectively. In some embodiments, a deception point (e.g., of deception points $510_C$-$510_D$) communicates with attacker 950 in such a way that the communications appear to originate from (the workload targeted by attacker 950 using malicious communication in) network 1510, such as using Network Address Translation (NAT). By way of non-limiting example, deception point $510_C$ remaps one IP address space into another by modifying network address information in Internet Protocol (IP) datagram packet headers, so the communication from deception point $510_C$ appears to come from workload $1550_B$ (e.g., the workload targeted by attacker 950 using malicious communication).

Alternatively or additionally, a deception point (e.g., deception point $510_C$-$510_D$) can communicate with attacker 950 through the enforcement point (e.g., of enforcement points $1540_1$-$1540_B$) associated with the workload targeted by the attacker, such that the communications appear to originate from (the workload targeted by attacker 950 using malicious communication in) network 1510.

Figure 16:
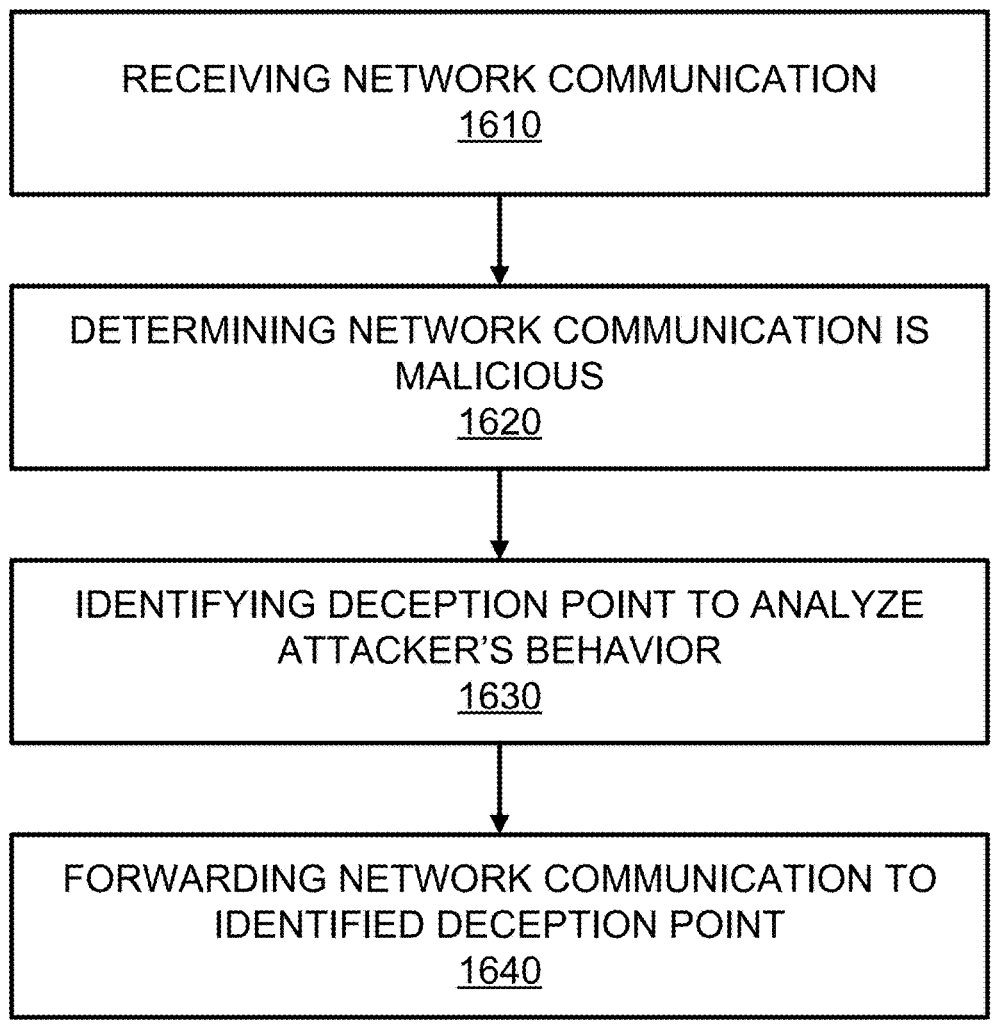
FIG. 16 is simplified flow diagram for a method of distributed threat detection and deception, according to various embodiments.

FIG. 16 illustrates a method 1600 for distributed threat detection and deception according to some embodiments. In various embodiments, method 1600 can be performed by one or more enforcement points (e.g., enforcement points $1540_{1,1}$-$1540_{1,A}$). Method 1600 can commence at step 1610. At step 1610, a network communication can be received. For example, enforcement point $1540_B$ receives a data packet addressed to workload $1550_B$ from attacker 950.

At step 1620, the received network communication can be determined to be (potentially) malicious (e.g., being used by attacker 950 for unauthorized access of workloads in network 1510). For example, a received data packet can be analyzed and compared against a (low-level) rule set. When characteristics of the data packet (e.g., 5-tuple) match a (low-level) rule to forward the data packet to a deception point (e.g., of deception points $510_C$-$510_D$), the data packet can be determined to be malicious. By way of further non-limiting example, the received data packet can be analyzed and compared to a set of predefined attack signatures. When the data packet matches an attack pattern (e.g., a pattern that exists within a specific section of the attack) of a predefined attack signature, the data packet can be determined to be malicious. By way of further non-limiting example, the data packet can be determined to be malicious when the data packet does not match a (low-level) rule and/or predefined attack signature.

At step 1630, a deception point to forward the (potentially) malicious communication can be identified. For example, a (matching) (low-level) rule and/or predefined attack signature indicates a deception point to which the malicious data packet is to be forwarded to. By way of further non-limiting example, once a data packet is determined to be malicious, a deception point to forward the malicious data packet is matched against a table of available applications and/or services. Associated with each application and/or service (and particular versions thereof) is a deception point hosting a decoy for the application and/or service (and particular versions thereof).

At step 1640, the (potentially) malicious communication can be forwarded to the identified deception point. In some embodiments, the malicious communication can be encapsulated (e.g., forwarded using one or more of tunnels $1525_C$ and $1525_D$).

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method by an enforcement point, the enforcement point communicatively coupled to a first data network and a second data network, the enforcement point not providing services in the second data network, the method comprising:

receiving, from a first workload in the second data network, a data packet addressed to a second workload in the second data network, the data packet requesting a service from the second workload;

determining the data packet is for unauthorized access of the second workload, the determining using at least some of a 5-tuple of the data packet;

identifying a deception point using the service, the deception point being in the first data network and including a decoy for the service; and redirecting the data packet to the deception point in the first data network, the deception point:
getting the data packet;
emulating an application providing the service;
producing a response to the data packet using the emulating and the data packet; and
providing the response to the first workload such that the response appears to originate from the second workload.

2. The method of claim 1, wherein the deception point is at least one of a bare-metal server and virtual machine.

3. The method of claim 1, wherein the deception point further performs a method comprising:
getting an image for an application;
creating an instance of the application in a container using the image, the creating including:
producing the container using the image;
allocating a filesystem of a host operating system to the container;
adding a read-write layer to the image; and
launching a process specified by the image; and
monitoring behavior from the processing, the monitoring including intercepting library calls, function calls, messages, and events from the container.

4. The method of claim 1, wherein the redirecting includes using a tunnel to forward the data packet to the deception point.

5. The method of claim 1, wherein the determining includes comparing the at least some of the 5-tuple of the data packet to a low-level rule set.

6. The method of claim 5, wherein the low-level rule set is produced using a high-level policy.

7. The method of claim 1, wherein the determining comprises analyzing the data packet using predefined attack signatures.

8. The method of claim 1, wherein the providing the response to the first workload includes sending the response through the enforcement point.

9. The method of claim 1, wherein the providing the response to the first workload includes using network address translation to send the response.

10. The method of claim 1, wherein the first data network and the second data network are in the same logical subnetwork and in different physical networks.

11. An enforcement point, the enforcement point communicatively coupled to a first data network and a second data network, the enforcement point not providing services in the second data network, the enforcement point comprising:

at least one hardware processor; and
a memory coupled to the at least one hardware processor, the memory storing instructions executable by the at least one hardware processor to perform a method comprising:
receiving, from a first workload in the second data network, a data packet addressed to a second workload in the second data network, the data packet requesting a service from the second workload;
determining the data packet is for unauthorized access of the second workload, the determining using at least some of a 5-tuple of the data packet;
identifying a deception point using the service, the deception point being in the first data network and including a decoy for the service; and
redirecting the data packet to the deception point in the first data network, the deception point:
getting the data packet;
emulating an application providing the service;
producing a response to the data packet using the emulating and the data packet; and
providing the response to the first workload such that the response appears to originate from the second workload.

12. The enforcement point of claim 11, wherein the deception point is at least one of a bare-metal server and virtual machine.

13. The enforcement point of claim 11, wherein the deception point further performs a method comprising:
getting an image for an application;
creating an instance of the application in a container using the image, the creating including:
producing the container using the image;
allocating a filesystem of a host operating system to the container;
adding a read-write layer to the image; and
launching a process specified by the image; and
monitoring behavior from the processing, the monitoring including intercepting library calls, function calls, messages, and events from the container.

14. The enforcement point of claim 11, wherein the redirecting includes using a tunnel to forward the data packet to the deception point.

15. The enforcement point of claim 11, wherein the determining includes comparing the at least some of the 5-tuple of the data packet to a low-level rule set.

16. The enforcement point of claim 15, wherein the low-level rule set is produced using a high-level security policy.

17. The enforcement point of claim 11, wherein the determining comprises analyzing the data packet using predefined attack signatures.

18. The enforcement point of claim 11, wherein the providing the response to the first workload includes sending the response through the enforcement point.

19. The enforcement point of claim 11, wherein the providing the response to the first workload includes using network address translation to send the response.

20. The enforcement point of claim 11, wherein the first data network and the second data network are in the same logical subnetwork and in different physical networks.

* * * * *